US012800119B2

(12) United States Patent
Li

(10) Patent No.: US 12,800,119 B2
(45) Date of Patent: Nov. 17, 2026

(54) FLUID FILLED FLAME SIMULATING DEVICE

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

(*) Notice: Subject to any disclaimer, the term of this patent is extended or adjusted under 35 U.S.C. 154(b) by 0 days.

(21) Appl. No.: 19/063,091

(22) Filed: Feb. 25, 2025

(65) Prior Publication Data

US 2026/0251275 A1 Aug. 27, 2026

(51) Int. Cl.

| | |
|---|---|
| ***F21S 10/04*** | (2006.01) |
| ***F21S 10/00*** | (2006.01) |
| ***F21V 23/04*** | (2006.01) |
| ***F21V 23/06*** | (2006.01) |
| ***F21V 29/502*** | (2015.01) |
| ***F21V 29/70*** | (2015.01) |
| ***F21V 29/74*** | (2015.01) |
| *G02F 1/1335* | (2006.01) |

(52) U.S. Cl.

CPC ........... *F21S 10/046* (2013.01); *F21S 10/002* (2013.01); *F21V 29/502* (2015.01)

(58) Field of Classification Search

CPC ................................ F21S 10/04; F21S 10/046

See application file for complete search history.

(56) References Cited

U.S. PATENT DOCUMENTS

| | | | |
|---|---|---|---|
| 7,178,941 | B2 | 2/2007 | Roberge |
| 7,261,455 | B2 | 8/2007 | Schnuckle et al. |
| 7,334,910 | B1 | 2/2008 | Blackstock |
| 7,837,355 | B2 | 11/2010 | Schnuckle |
| 8,070,319 | B2 | 12/2011 | Schnuckle et al. |
| 8,258,644 | B2 | 9/2012 | Kaplan |
| 8,342,712 | B2 | 1/2013 | Patton et al. |
| 9,133,992 | B2 | 9/2015 | Lee |

(Continued)

FOREIGN PATENT DOCUMENTS

| | | | |
|---|---|---|---|
| CN | 203273713 | U | 11/2013 |
| CN | 207674336 | U | 7/2018 |

(Continued)

OTHER PUBLICATIONS

International Search Report and Written Opinion for International Patent Application No. PCT/US2022/018718, mailed Jun. 8, 2022 (10 pages).

(Continued)

*Primary Examiner* — Alexander K Garlen

(74) *Attorney, Agent, or Firm* — Ashurst Perkins Coie US LLP

(57) ABSTRACT

A lighting device includes an outer shell, a screen assembly positioned partially within the outer shell, an illumination assembly positioned below the screen assembly, and a motion generator. The screen assembly includes a screen shaped to simulate an appearance of a flame, a suspension platform configured to support the flame, a body configured to support the suspension platform, and a base. The device includes a cover removably coupled to the base such that removal of at least of portion of the cover from the base enables a fluid to be filled into a chamber formed by at least the body and the base.

20 Claims, 39 Drawing Sheets

(56) References Cited

U.S. PATENT DOCUMENTS

| | | | | |
|---|---|---|---|---|
| 9,719,643 | B1 | 8/2017 | Cheng | |
| 11,027,036 | B2 | 6/2021 | Li | |
| 2010/0079999 | A1* | 4/2010 | Schnuckle | F21S 6/001 362/253 |
| 2011/0019422 | A1* | 1/2011 | Schnuckle | F21S 10/04 362/277 |
| 2011/0110073 | A1* | 5/2011 | Schnuckle | H01K 7/06 362/284 |
| 2011/0127914 | A1* | 6/2011 | Patton | F21K 9/23 362/249.06 |
| 2011/0311951 | A1 | 12/2011 | Piontek | |
| 2013/0127178 | A1 | 5/2013 | Indig | |
| 2014/0211499 | A1 | 7/2014 | Fong et al. | |
| 2014/0268663 | A1 | 9/2014 | Yang | |
| 2016/0263613 | A1* | 9/2016 | Lin | F21S 10/04 |
| 2016/0298816 | A1* | 10/2016 | Fang | F21K 2/00 |
| 2018/0306396 | A1 | 10/2018 | Patton | |
| 2022/0221119 | A1* | 7/2022 | Jacobson | A61L 9/122 |
| 2024/0035634 | A1* | 2/2024 | Wu | F21S 10/002 |
| 2024/0318797 | A1 | 9/2024 | Schnuckle | |

FOREIGN PATENT DOCUMENTS

| | | | | |
|---|---|---|---|---|
| WO | 2017122094 | A1 | 7/2017 | |
| WO | WO-2017147898 | A1 * | 9/2017 | F21V 33/0056 |
| WO | WO-2022187494 | A1 * | 9/2022 | F21S 6/001 |

OTHER PUBLICATIONS

Extended European Search Report for European Patent Application No. 22764057.0, mailed Jan. 8, 2025 (11 pages).

International Search Report and Written Opinion mailed Jun. 8, 2026, in International Patent Application No. PCT/US26/16564, 10 pages.

* cited by examiner

FLUID FILLED FLAME SIMULATING DEVICE

TECHNICAL FIELD

The present technology relates generally to a lighting device. More particularly, the present technology relates to a lighting apparatus having a motion generator and an article stimulated or motivated by the motion generator. The motion generator generates a magnetic field that can alter the position or orientation of a magnetically responsive object that is confined in a restricted space or boundary.

BACKGROUND

Over the years artificial fireplaces and candles have attempted to mimic the random flicker of a flame. Flexible filaments have been incorporated into these structures to simulate the appearance of a flame. Attempts have been made to actuate the filament using various mechanical and electrical devices. However, these prior devices create systematic predictable movement that does not realistically replicate the unpredictable, random flicker and flutter of a flame.

SUMMARY

Embodiments according to aspects of the invention provide lighting devices that can simulate movements of real flames.

In one example aspect, a lighting device includes an outer shell and a screen assembly positioned partially within the outer shell. The screen assembly includes a screen shaped to simulate an appearance of a flame, a suspension platform configured to support the flame, a body configured to support the suspension platform, a base, and a cover removably coupled to the base. Removal of at least of portion of the cover from the base enables a fluid to be filled into a chamber formed by at least the body and the base. The lighting device includes an illumination assembly positioned below the screen assembly that includes a reflective surface and a light source positioned above the reflective surface configured to emit light downwards towards the reflective surface such that light beams are reflected by the reflective surface onto the screen. The lighting device also includes a motion generator having a container formed by a soundproof material, an object that is magnetically responsive positioned within the container, an electromagnet coil positioned below the container, and a heat sink positioned below the electromagnet coil. Upon a voltage power being applied to the electromagnet coil, the object is configured to move within the container and cause displacement of the screen such that the displacement of the screen resembles movement of a real flame.

In another example aspect, a lighting device includes an outer shell and a screen assembly positioned partially within the outer shell that includes a screen shaped to simulate an appearance of a flame, a suspension platform configured to support the flame, a support structure configured to support the suspension platform, and a cover that comprises a first part and a second part coupled to the support structure. The second part is removably coupled to the first part, and removal of the second part enables a fluid to be filled into a chamber. The lighting device includes an illumination assembly positioned above the screen assembly that comprises a reflective surface, and a light source positioned below the reflective surface configured to emit light upwards towards the reflective surface such that light beams are reflected by the reflective surface onto the screen. The lighting device also includes a motion generator having a container formed by a soundproof material, an object that is magnetically responsive positioned within the container, an electromagnet coil positioned above the container, and a heat sink positioned above the electromagnet coil. Upon a voltage power being applied to the electromagnet coil, the object is configured to move within the container and cause displacement of the screen such that the displacement of the screen resembles movement of a real flame.

BRIEF DESCRIPTION OF THE DRAWINGS

In the various figures, which are not necessarily drawn to scale, like numerals throughout the figures identify substantially similar components.

DETAILED DESCRIPTION

Figure 1:
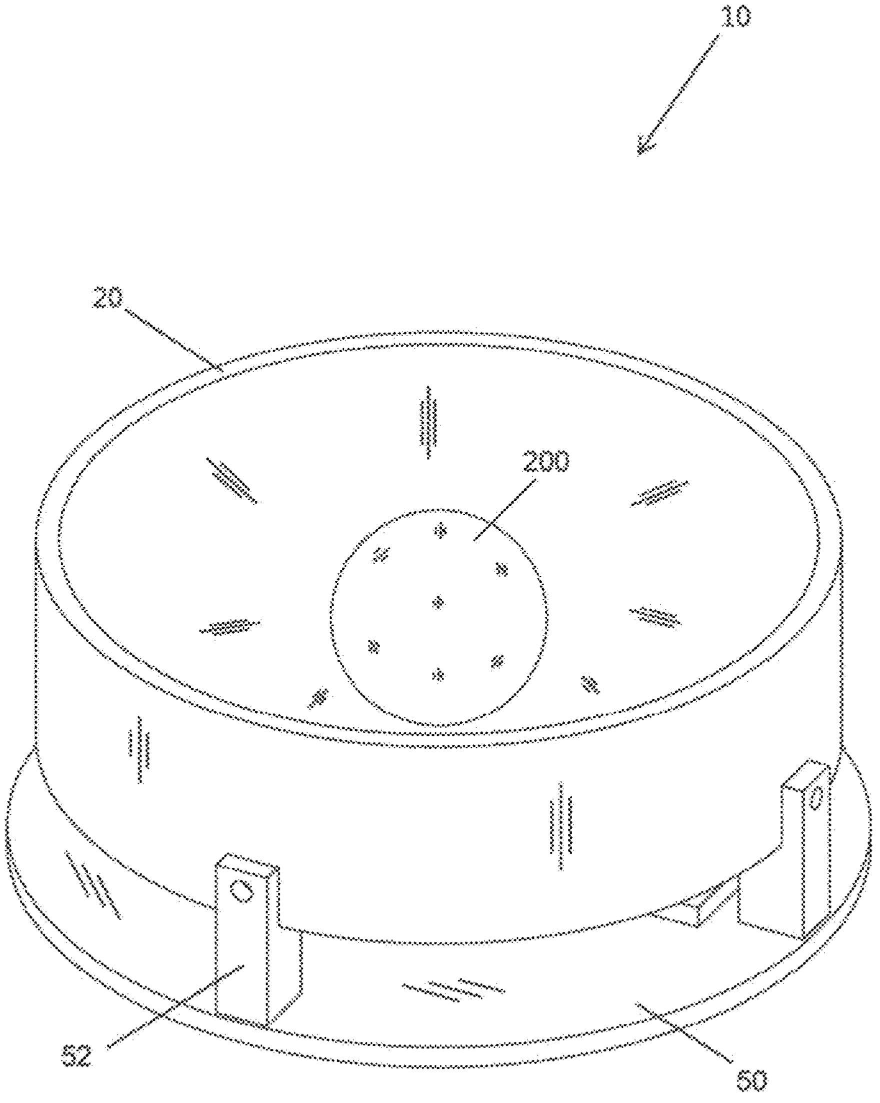
FIG. 1 is a top perspective view of a motion generator embodiment of the present technology shown with stationary confinement.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations can be made in the present technology without departing from the scope or spirit of the invention. By way of example, those skilled in the art will recognize that features illustrated or described as part of one embodiment, can be used in another embodiment to yield a still further embodiment. Thus, it is intended that the present technology also cover such modifications and variations that come within the scope of the appended claims and their equivalents.

The various apparatus and methods of embodiments of the present technology are particularly well suited to generate randomized motion of a magnetically responsive object. When the object itself exhibits magnetic properties, the motion generator generates magnetic fields that act upon the object in a way that consequently shifts the magnetic pole alignment of the object. When an object is free to move within a bound space, the change in pole alignment of the object can move the object within the boundary of confinement. The shifting magnetic pole alignment is further particularly well suited for creating a randomized motion or actuation of a magnetically responsive object. The various features of the motion generator and associated methods are further illustrated in the figures.

The present technology provides a low power device capable of randomizing an object's displacement. The present technology can further utilize the self-randomizing displacement of the object to randomize motion of articles responsive to the object.

Generally, the motion generator of the present technology includes an electromagnet, a magnetically responsive object, and a confinement or container for the object. At least one electromagnet is positioned adjacent or near the container such that a magnetic field of the electromagnet acts upon or affects the magnetically responsive object contained by the container. The container confines the movement of the magnetically responsive object but also permits movement of the object with multiple degrees of freedom within the container. The container can include a parabolic, elliptical, concave or otherwise curved surface or structure that confines the rolling or tumbling of the object while urging the object to return under the force of gravity to a rest position. Movement of the object within the container can be responsive to gravitational and magnetic forces. The container can be static or can include flexible or pivotable mounting to allow for a wobble or rocking motion of the container as the position of the object bounded by the container fluctuates. The position of the magnetically reactive object bounded by the container can be used to drive or compel movement of other articles that can be in some way coupled to the magnetically responsive object. Example modes of coupling include magnetic, electrical, and physical. Alternatively, an article can be located adjacent to the container such that as the object moves bounded the container, the magnetically responsive object can arbitrarily or randomly contact the adjacent paired article.

Alternative embodiments of the invention can combine the motion generator and one or more paired articles with a light source intended to illuminate at least a portion of one or both of the motion generator and the paired article. The container can include reflectors that reflect the light source to create an appearance that the light source is moving, particularly in embodiments employing a movable container. Alternatively, the light source can be combined with the motion generator in a manner to direct light towards a target, such as a moving target that moves in response to the motion generator. The light can be modulated in intensity, color, focus, etc. For example, a light blocker can move in and out of the light beam to modulate the light intensity and the characteristics of the beam. Alternatively, the light blocker can be made of a multi-colored material such that as the light blocker moves through the light beam, a modulating color would be generated and perceived. Further, alternatively, one or more of the object, articles, and apparatus can be constructed of materials, configured and located to reflect, diffuse and/or create shadows from the light source. Further, the light source can be reflected by a concave mirror to direct a beam of light towards a screen assembly. The light source and/or other components can block some of the emitted light to create a varying light intensity in the beam or shadows displayed on the screen. In some embodiments, the shadow can provide the appearance of a candle wick at the base of the screen that receives the light.

Other embodiments of the invention can encase portions of the motion generator and/or the paired articles within a viscous fluid. By way of example, and without limitation intended, one or more of the magnetically responsive object, container and paired articles can be partially or fully immersed in a liquid. The viscosity of the liquid can be selected to affect the rate of displacement of moving bodies within the liquid. Also, the fluid can be used to affect thermal-management, optics, acoustics, electrical conductivity, and physical wear on the moving parts. When selecting the fluid the user can consider many properties of the fluid including the index of refraction, viscosity, clarity, specific gravity, coefficient of friction, coefficient conductivity, freezing point and (non) toxicity.

With reference to the Figures, various embodiments and components of the motion generator according to aspects of the invention will be described in greater detail. FIGS. 1-4 illustrate a motion generator 10 that confines a magnetically reactive object 200 within a boundary of a container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes a sidewall 24 that extends between a lower or bottom portion 28 and an upper top ledge 26 of the container. An interior surface 34 of sidewall 24 extends between the upper top ledge 26 and a nonplanar and curved bottom portion 30. The transition between upper top ledge 26 and bottom portion 30 can be chamfered or otherwise curved to provide a gradual curved intersection 36. Further, bottom portion 30 can curve upward and outward from a center region 40 of bottom portion 30 to form a raised center region with respect to bottom portion 30. Alternatively, the non-planar bottom portion 30 can include an upward extending bump 42 positioned in the center region 40 of the bottom portion 30 of interior surface 34. It is to be understood for all embodiments described herein that various modifications from the example configurations are contemplated as being useful in the present technology. For example, it is contemplated that certain embodiments of the invention can involve planar portions for the interior surface of the container.

Figure 2:
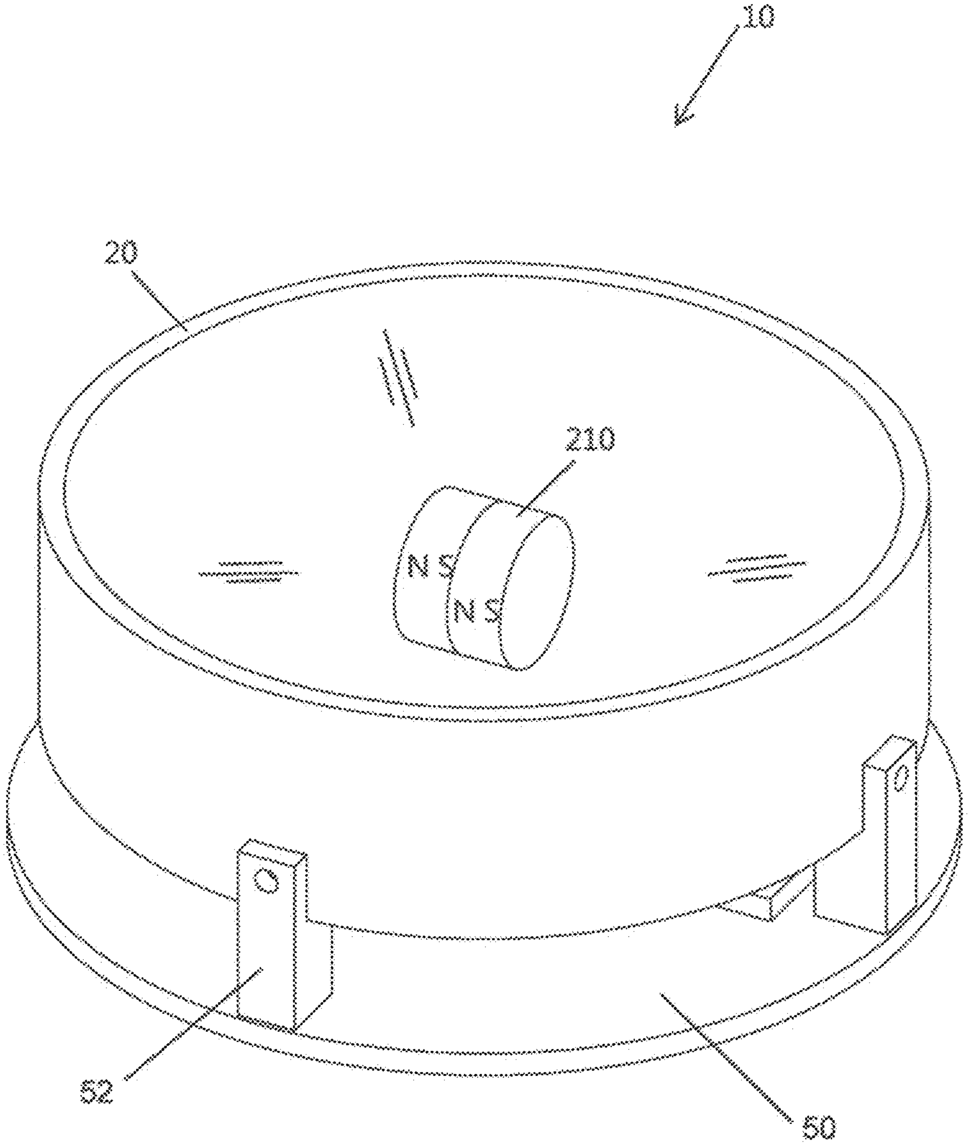
FIG. 2 is a partial sectional perspective view of a motion generator of the present technology of the type shown in FIG. 1.
Figure 3:
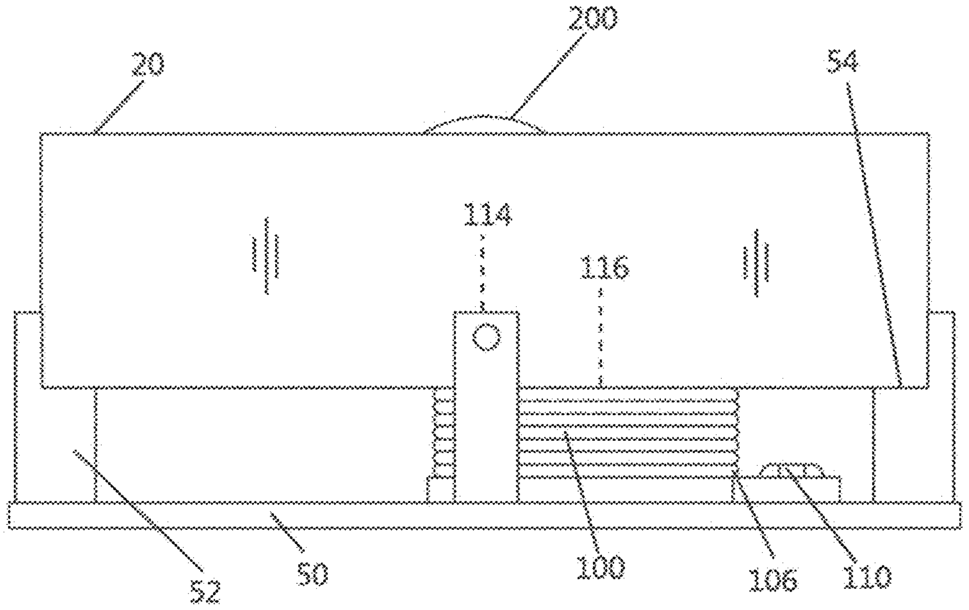
FIG. 3 is a side perspective view of a motion generator of the present technology of the type shown in FIG. 1.
Figure 4:
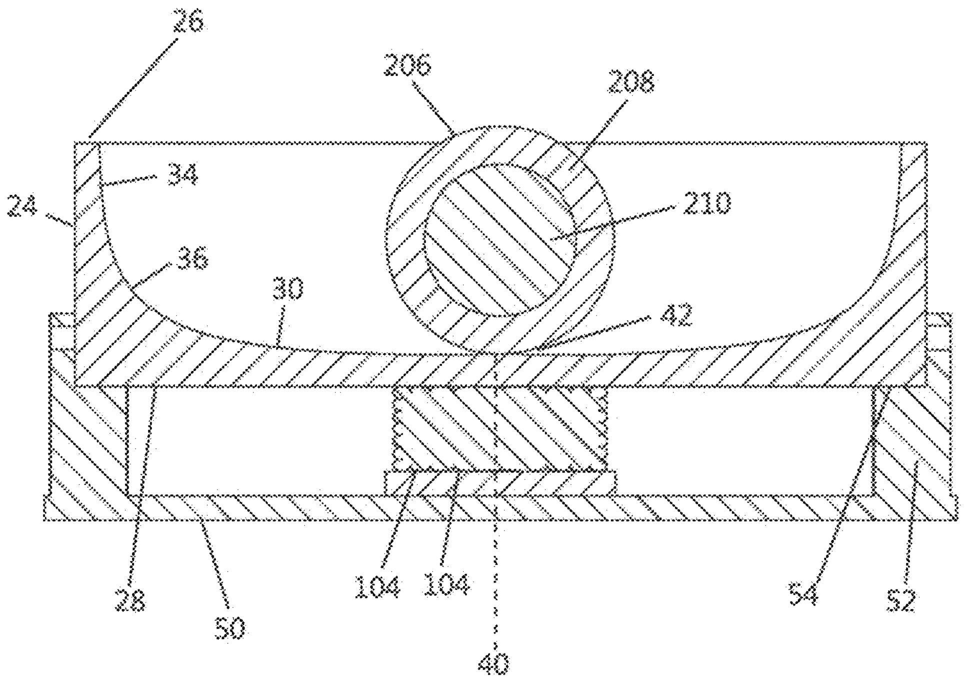
FIG. 4 is a partial sectional side view of a motion generator of the present technology of the type shown in FIG. 1.
Figure 5:
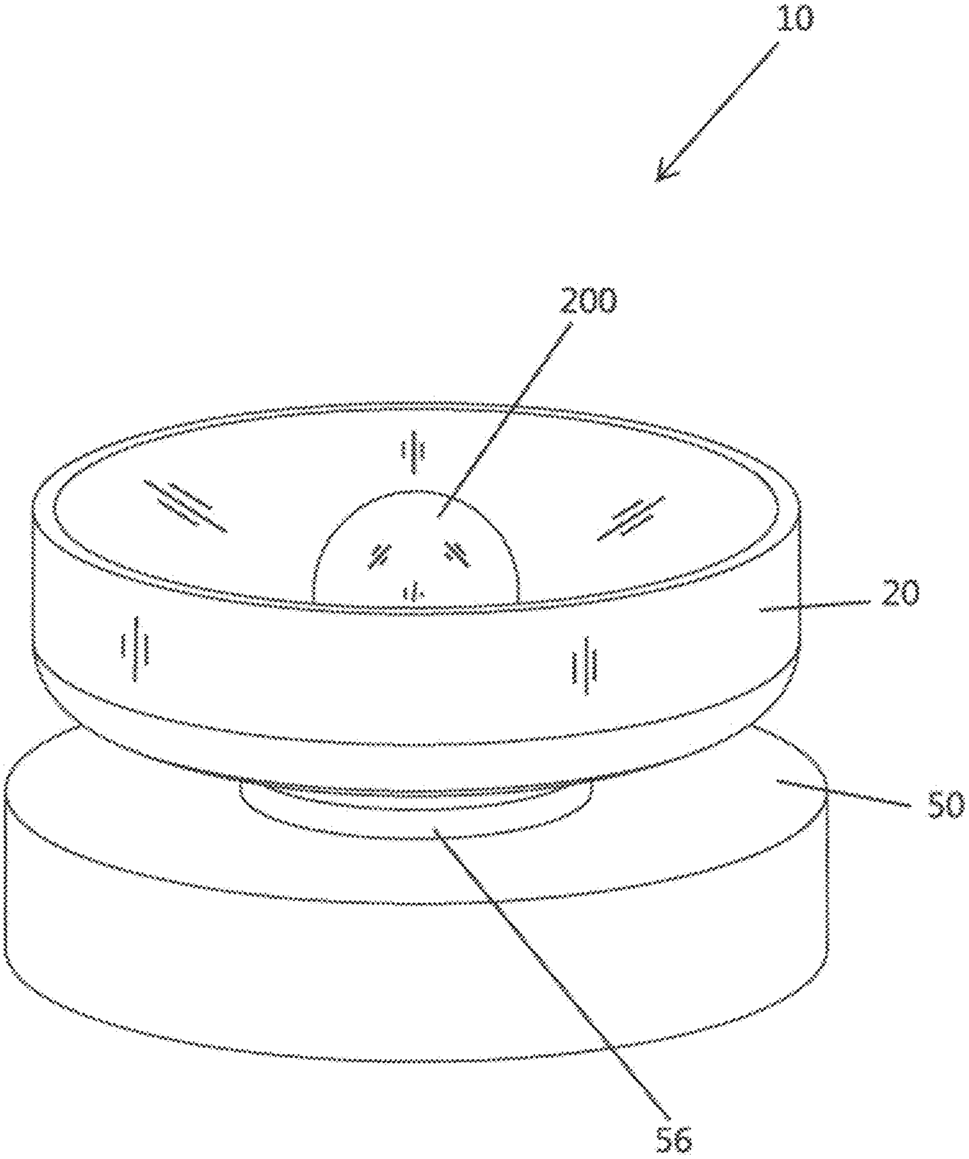
FIG. 5 is a top perspective view of a motion generator embodiment of the present technology shown with moving confinement.
Figure 6:
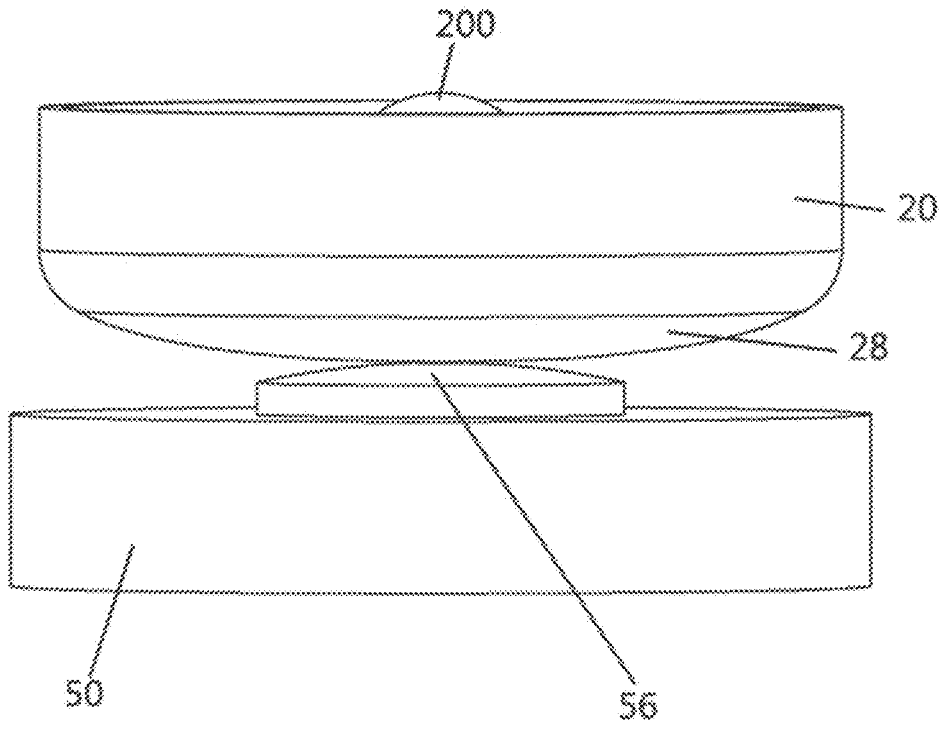
FIG. 6 is a side perspective view of a motion generator of the present technology of the type shown in FIG. 5.
Figure 7:
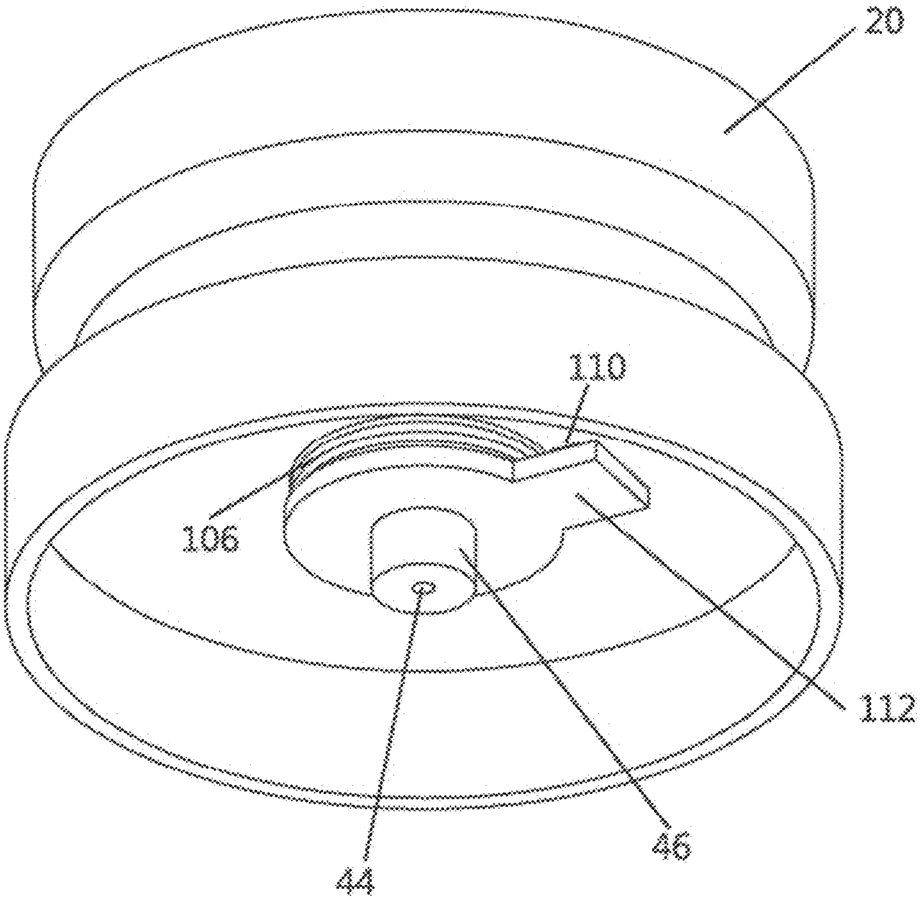
FIG. 7 is a bottom perspective view of a motion generator of the present technology of the type shown in FIG. 5.
Figure 8:
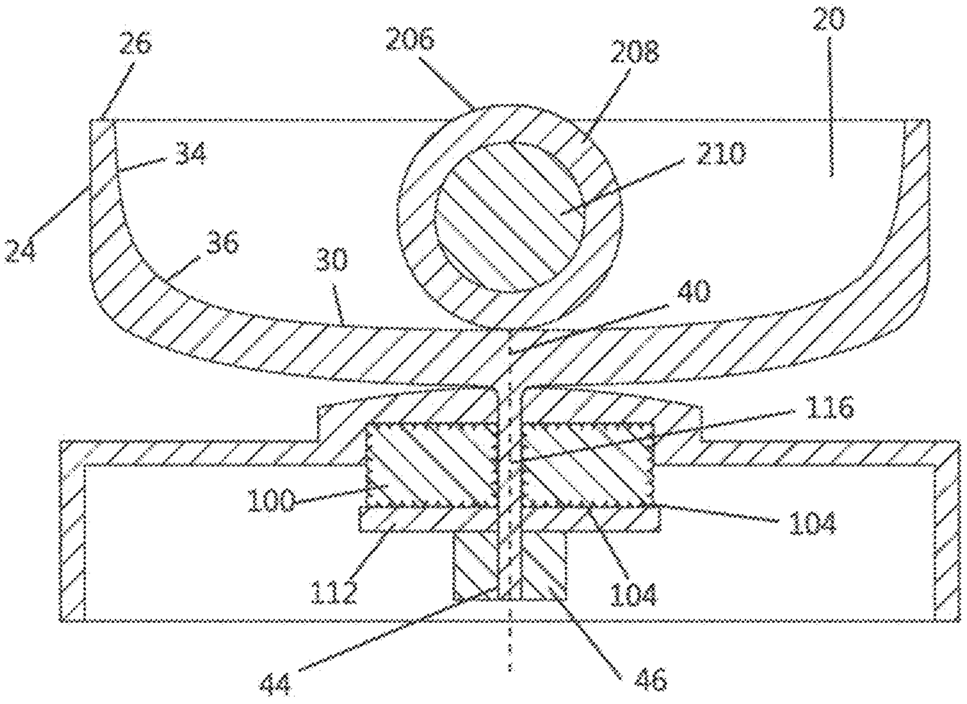
FIG. 8 is a partial sectional side view of a motion generator of the present technology of the type shown in FIG. 5.

This embodiment of the random motion generator 10 includes a single electromagnetic coil 100. The coil includes several windings 104 of a continuous wire 106. The ends of the coiled windings 104 are coupled to electrical contact or conductor pads 110. A low voltage power supply can be electrically coupled to the pads to thereby cause a flow of electrons through the coil windings 104. When electrons flow through the coil a magnetic field is established. A central core of the windings 104 can be hollow or filled with air. The center or central axis 116 of the coil windings 104 of the continuous wire 106 can be offset or mis-aligned with respect to a central axis 40*a* of the housing 20 (see FIG. 3), such that magnetic flux from windings 104 can have an axis that is spaced from central axis 40*a*. The object 200 can have a spherical outer surface 206. FIGS. 2 and 4 illustrate a disc magnet 210 that can be embedded in an encasement 208 having a spherical outer surface 206. Alternatively, the object can have a spherical shape and made from a permanent magnetic material or can be made from a material having magnetically responsive properties (see FIGS. 1 and 3). Those skilled in the art will appreciate that the various embodiments described herein utilizing a spherical object 200 can instead utilize an elliptical object or other shape made of magnetic material or having disc magnets embedded therein as illustrated in FIG. 4. In some embodiments, object 200 has an exterior surface that facilitates movement with respect to surface 34, driven by magnetic interaction between electromagnetic coil 100 and magnet 210. Outer surface 206 can therefore be rounded to facilitate a rolling motion when responding to magnetic field generated by electromagnetic coil 100.

The shape of the object together with the shape of the container 20 and/or surface 34 and gravitational forces can cause the object 200 to come to rest at a rest location 40 of the container 20 when no magnetic field from the coil 100 is present, or the magnetic field is insufficient to cause motion to object 200. When electricity passes through the coil windings 104, a magnetic field results that acts upon the magnetically responsive object 200 and displaces the object 200 from the rest position 40 of the container 20. The inner surface 34 of container 20 can be configured to randomize motion of the object 200 within a boundary defined by container 20 when the object is responding to the applied magnetic field. If the object 200 exerts a magnetic field of its own, the magnetic moment of the object 200 and the magnetic moment of an active electromagnetic coil 100 can interact, further urging the object 200 to move upon surface 34 of the container 20, preferably in an ever-changing pattern of motion. Depending upon the direction of the current through the electromagnetic coil 100 and the orientation of the magnetic moment of the object 200, the object 200 can be attracted toward or pushed away from a polar axis 116 of the coil 100. As the object 200 moves along surface 34, the orientation of the magnetic moment of the object 200 can be ever-changing, which further contributes to the randomized motion of the object 200. Also, the randomness of motion is further compounded by the gravitational forces acting upon the object 200 as it moves about on the curved inner surface 34 of the container 20.

Referring next to FIGS. 5-8 a motion generator 10 is illustrated having a container, base or housing 20 that confines a magnetically responsive object 200 within a boundary defined by the container. In this embodiment the container 20 is shown supported by a dome 56 extending upward from the mounting base 50. The container 20 includes an elastic stem 44 extending from the bottom of the container. The stem extends through an aperture in the dome 56, and a free end of the elastic stem 44 is fixed to a retainer 46 positioned under the base or board of coil 100. The elastic stem 44 can be tensioned so that the bottom 28 of the container presses against the dome 56 but remains flexible enough to allow the container to see saw, wobble, or rock about the dome with multiple degrees of freedom. Movement of container 20 with respect to mounting base 50 can be driven by movement of object 200 along surface 34 in response to an applied magnetic field. The weight of object 200 having a gravitational vector that is spaced from an axis of elastic stem 44 causes the movement of container 20 with respect to mounting base 50. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Inner surface 34 can be chamfered or otherwise curved to provide a gradual curved profile between upper top ledge 26 and bottom portion 30. Further, the bottom portion 30 of surface 34 can curve upward at a center region 40.

Electromagnetic coil 100 can be fixed to the mounting base 50 under the container 20 and held in place under the tension of the elastic stem 44. The coil 100 can include several windings 104 of a continuous wire 106. The ends of the coiled windings 104 are coupled to electrical contact or conductor pads. A low voltage power supply can be electrically coupled to the pads to thereby cause a flow of electrons through the coil windings 104. When electrons flow through the coil 100, a magnetic field is established. A central core of the windings can be hollow or filled with air. The center or central axis of the coil windings 104 of the continuous wire 106 can be aligned with the center of the housing 20.

Figure 9:
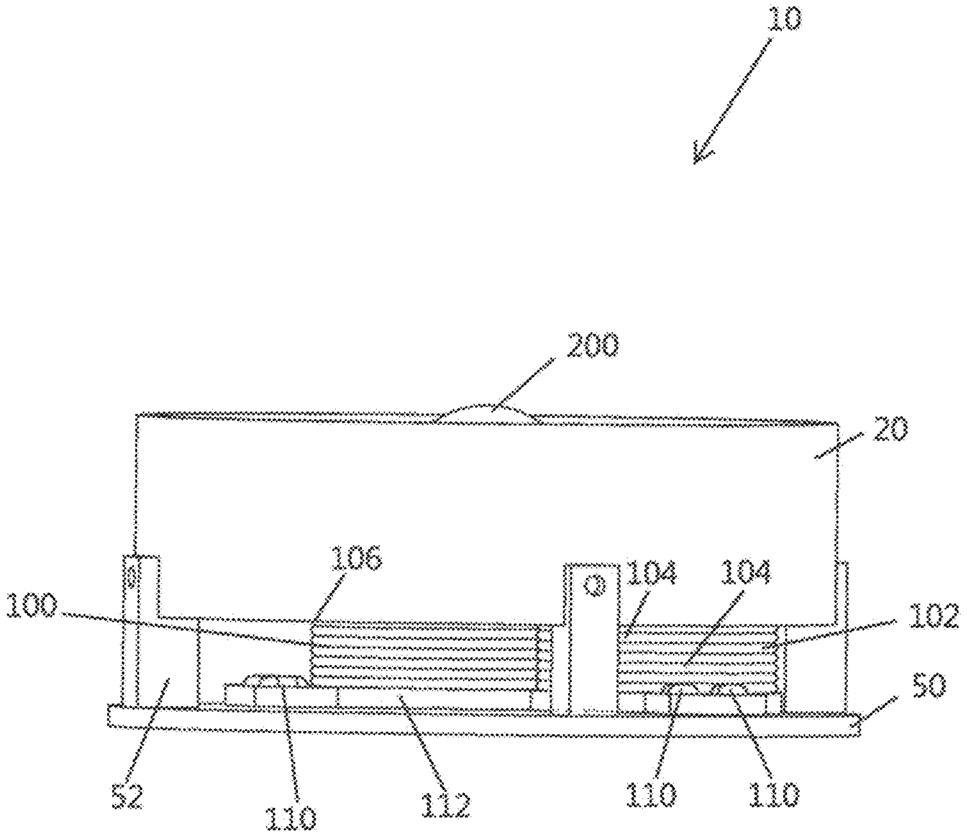
FIG. 9 is a side perspective view of a motion generator embodiment of the present technology having two electromagnets positioned under a positional confinement.
Figure 10:
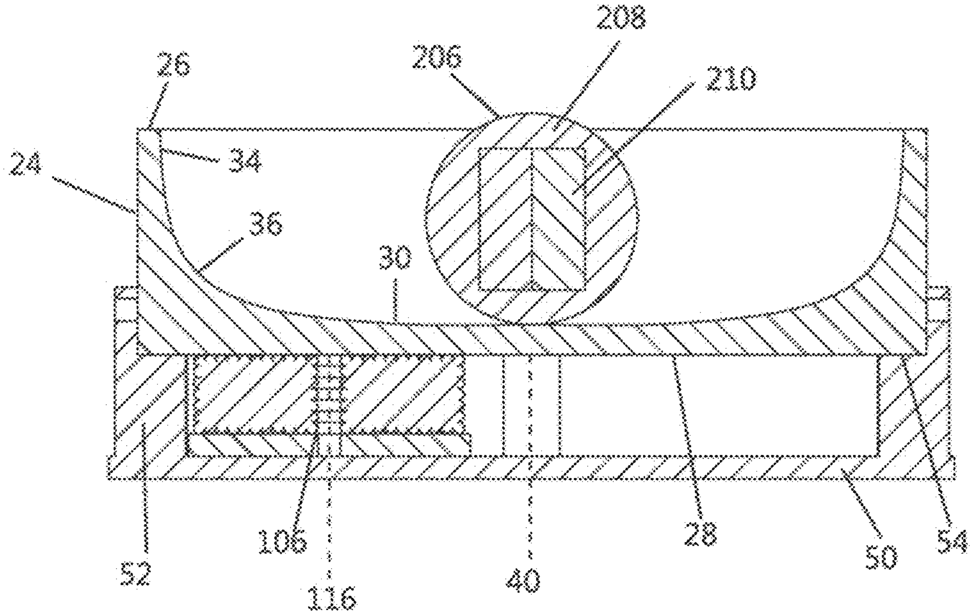
FIG. 10 is a partial sectional side perspective view of a motion generator of the present technology of the type shown in FIG. 9.
Figure 11:
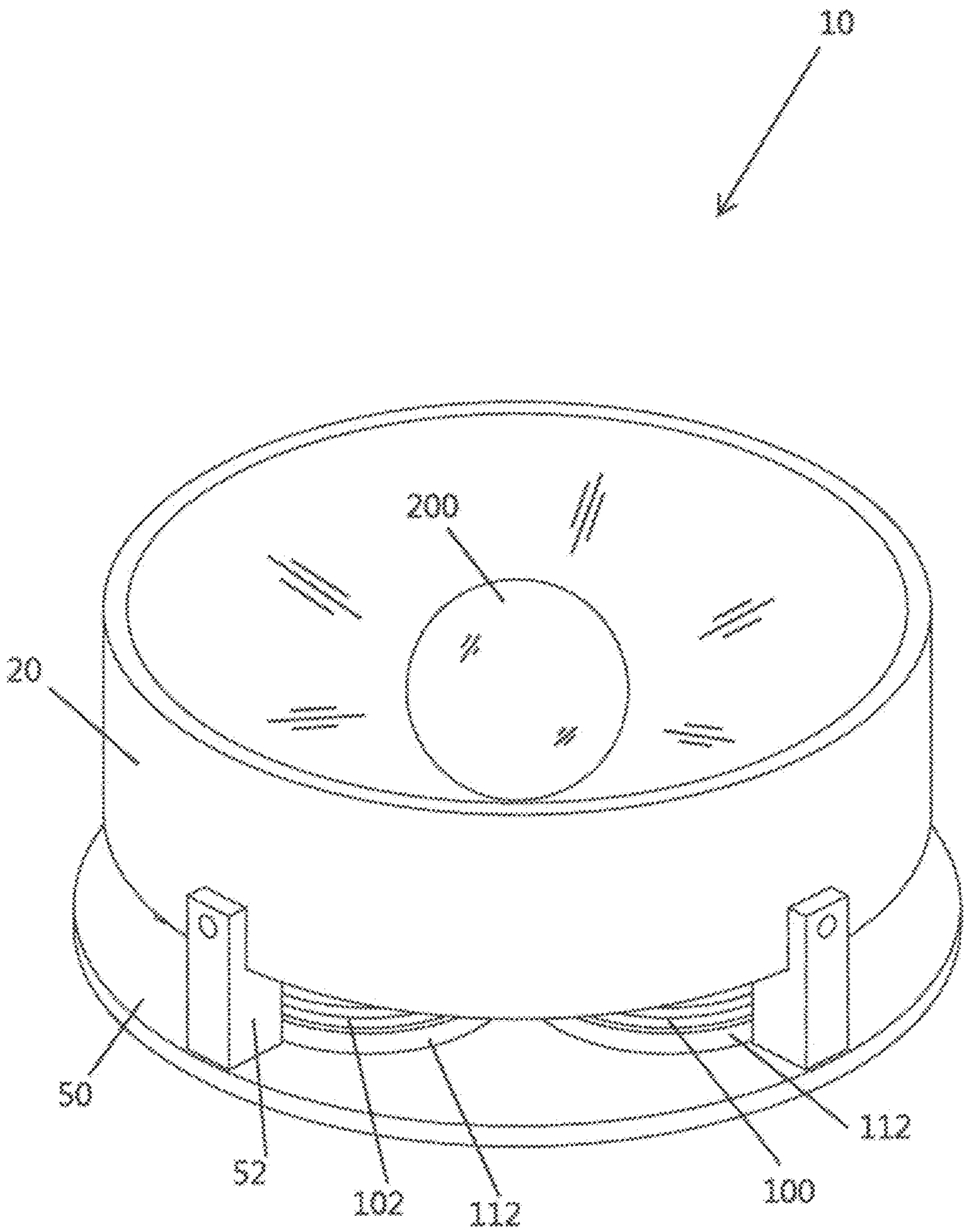
FIG. 11 is a top perspective view of a motion generator embodiment of the present technology shown with positional confinement.
Figure 12:
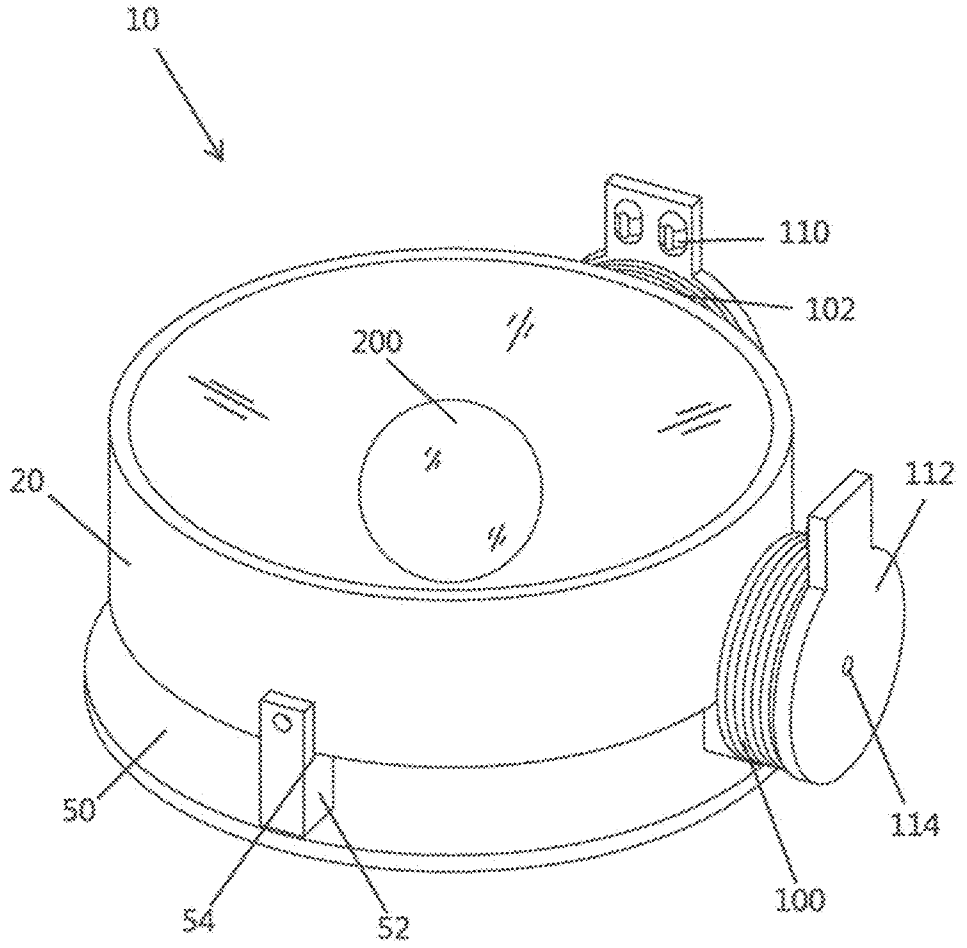
FIG. 12 is a top perspective view of a motion generator embodiment of the present technology having two electromagnets positioned on sides of a positional confinement.

Referring next to FIGS. 9-11 a motion generator 10 is illustrated that confines a magnetically responsive object 200 within a boundary defined by container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 can be chamfered or otherwise curved between the upper top ledge 26 and the bottom portion 30. Further, the bottom portion 30 can curve upward at center region 40. Alternatively, the non-planar bottom portion 30 can include an upwardly extending bump positioned in the center region 40 of the bottom portion 30.

This embodiment of the motion generator 10 can include two or more electromagnetic coils 100 positioned underneath the container 20. Each coil 100 includes several windings 104 of a continuous wire 106. The ends of the coiled windings 104 are coupled to electrical contact or conductor pads 110 formed on board 112. A low voltage power supply can be electrically coupled to the pads to thereby cause a flow of electrons through the coil windings 104. Power can be supplied to the two coils simultaneously or can alternate between the two coils 100. When electrons flow through the coil a magnetic field is established associated with each coil. The object 200 can have a spherical outer surface 206. FIG. 10 illustrates a disc magnet 210 that is embedded in an encasement 208 having a spherical outer surface 206. Alternatively, the object can have a spherical shape and made from a permanent magnetic material or can be made from a material having magnetically responsive properties (see FIG. 9).

The shape of the object together with the shape of the container 20 and/or surface 34 and gravitational forces can cause the object 200 to come to rest at a rest location of the container 20 when no magnetic field from the coils 100 is present, or the magnetic field is insufficient to cause motion to object 200. When electricity passes through the coil windings 104, a magnetic field results that acts upon the magnetically responsive object 200 and displaces the object 200 from the rest position 40 of the container 20. The inner surface 34 of container 20 can be configured to randomize motion of the object 200 within a boundary defined by container 20 when the object is responding to the applied magnetic field. If the object 200 exerts a magnetic field of its own, the magnetic moment of the object 200 and the magnetic moment of an active electromagnetic coil 100 can interact, further urging the object 200 to move upon surface 34 of the container 20, preferably in an ever-changing pattern of motion. Depending upon the direction of the current through the electromagnetic coil 100 and the orientation of the magnetic moment of the object 200, the object 200 can be attracted toward or pushed away from a polar axis 116 of the coil 100. As the object 200 moves along surface 34, the orientation of the magnetic moment of the object 200 can be ever-changing, which further contributes to the randomized motion of the object 200. Also, the randomness of motion is further compounded by the gravitational forces acting upon the object 200 as it moves about on the curved inner surface 34 of the container 20.

Referring next to FIGS. 12-16 a motion generator 10 is illustrated that confines a magnetically reactive object 200 within a boundary defined by a container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 can be chamfered or otherwise curved between the upper top ledge 26 and the bottom portion 30. Further, the bottom portion 30 can curve upward from the center region 40.

Figure 13:
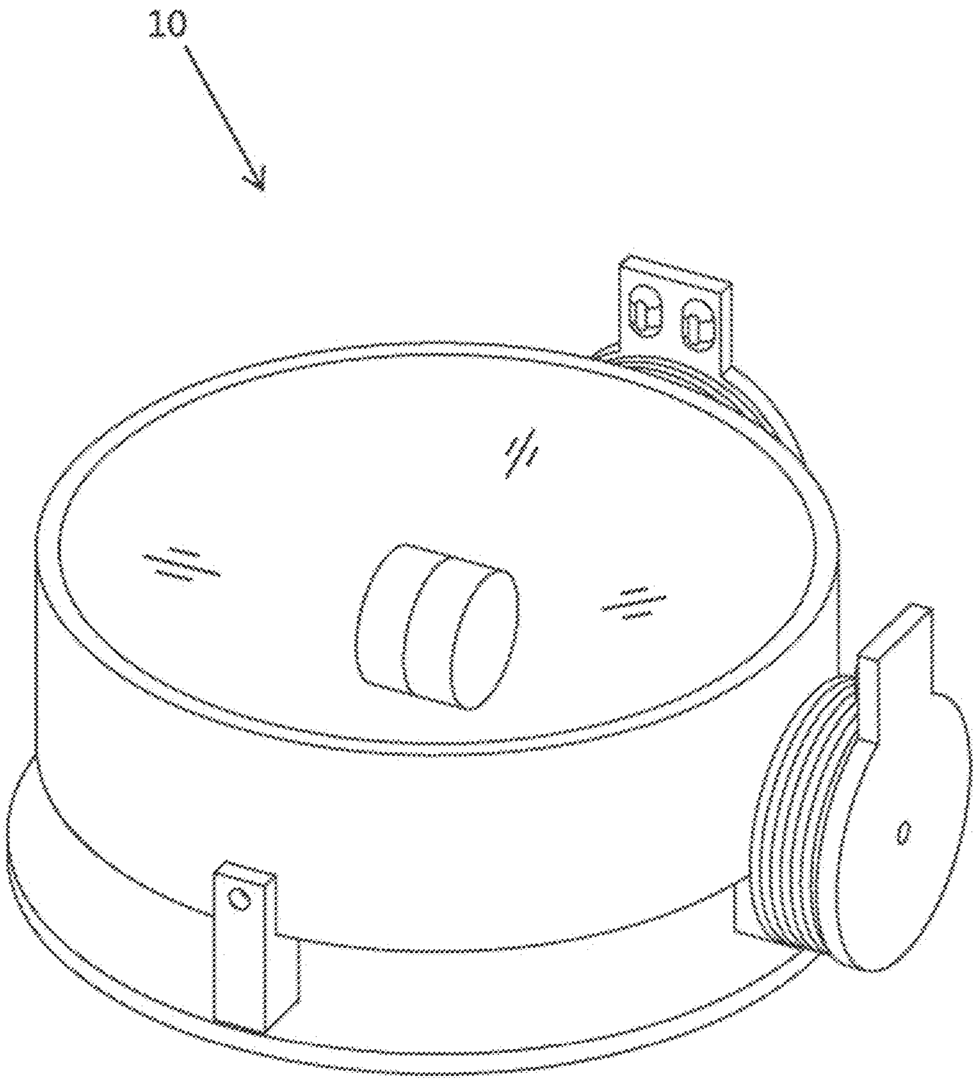
FIG. 13 is a partial sectional top perspective view of a motion generator embodiment of the present technology having two electromagnets positioned on sides of a positional confinement.
Figure 14:
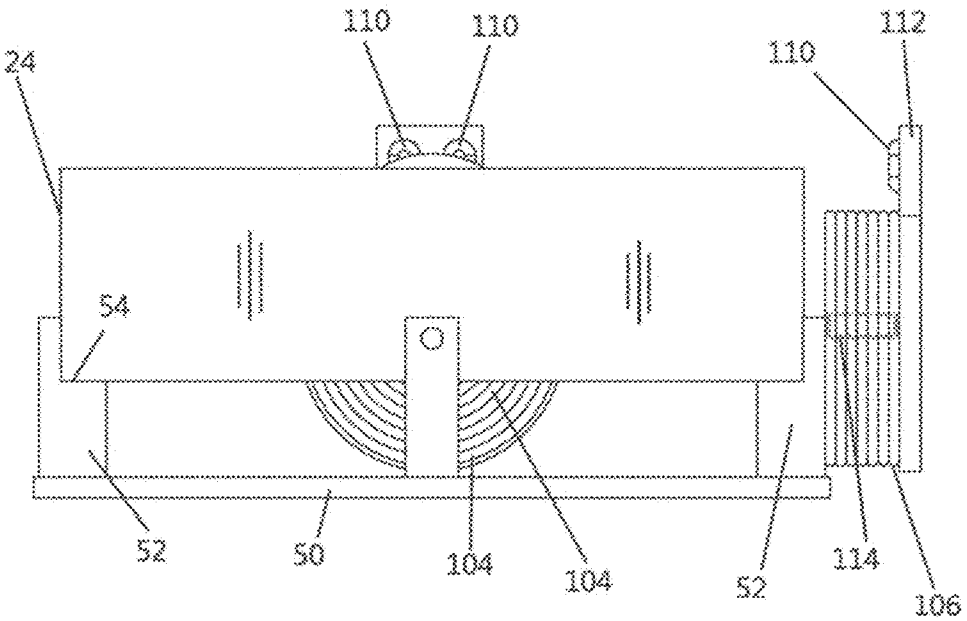
FIG. 14 is a side view of a motion generator of the invention of the type shown in FIG. 12.
Figure 15:
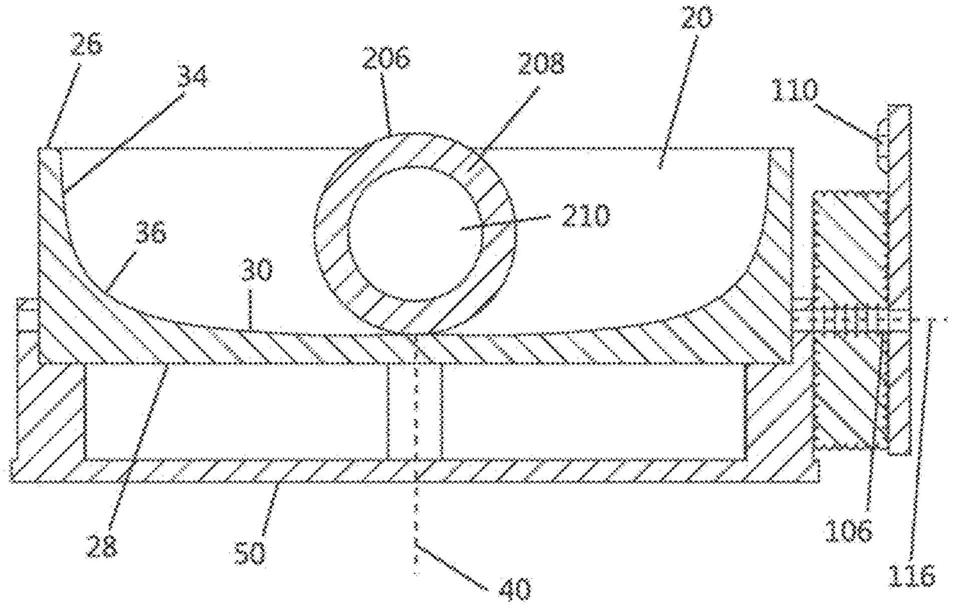
FIG. 15 is a partial section right side view of a motion generator of the present technology of the type shown in FIG. 12.
Figure 16:
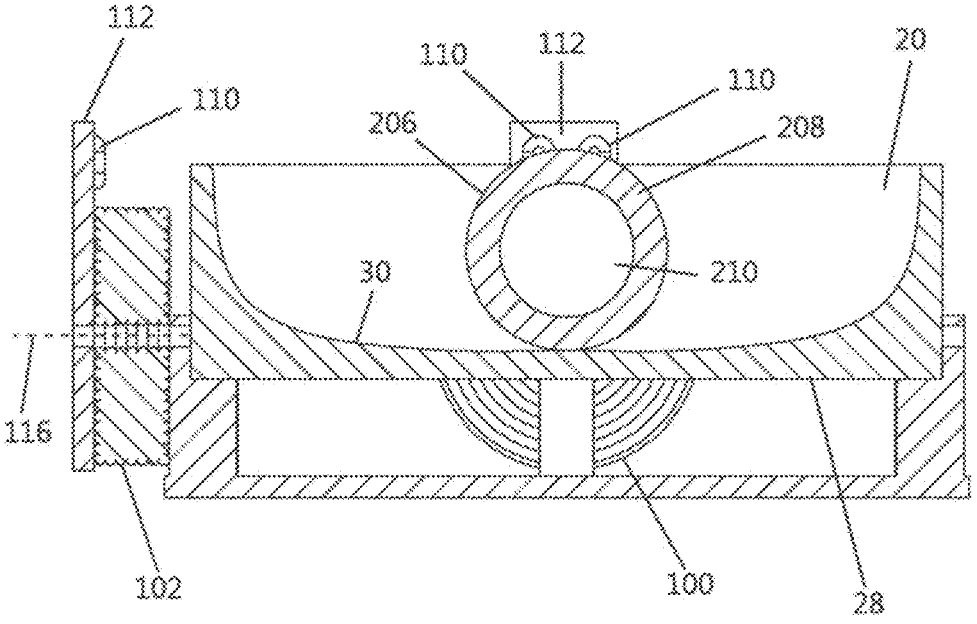
FIG. 16 is a partial sectional left side view of a motion generator of the present technology of the type shown in FIG. 12.
Figure 17:
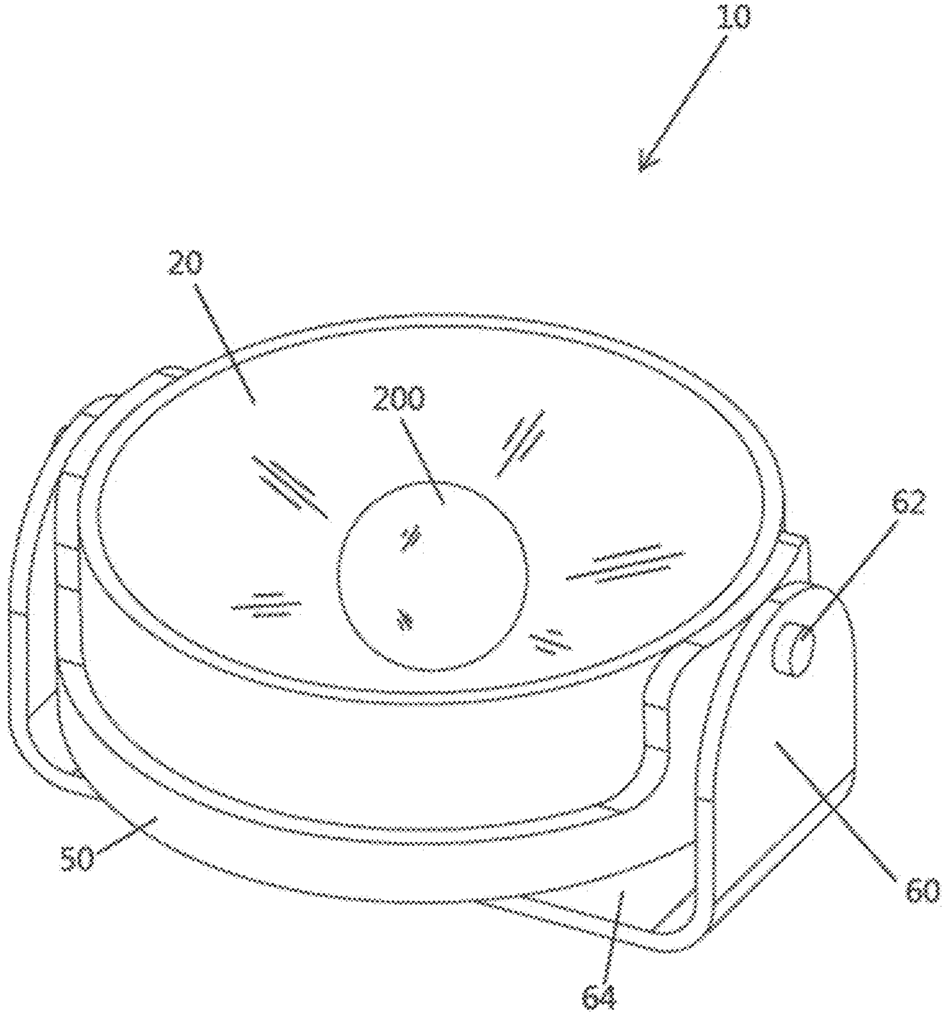
FIG. 17 is a top perspective view of a motion generator embodiment of the present technology shown with single axis gimbaled confinement.
Figure 18:
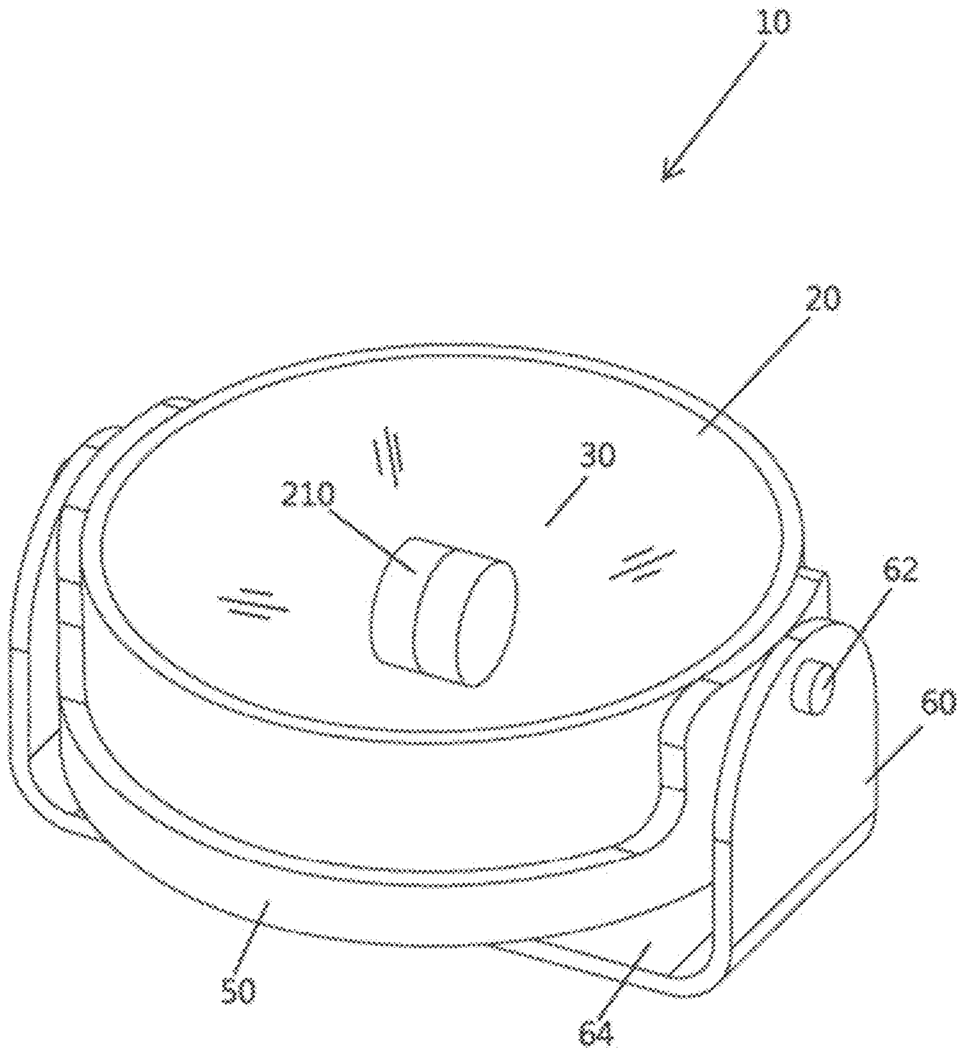
FIG. 18 is a partial sectional perspective view of a motion generator of the present technology of the type shown in FIG. 17.
Figure 19:
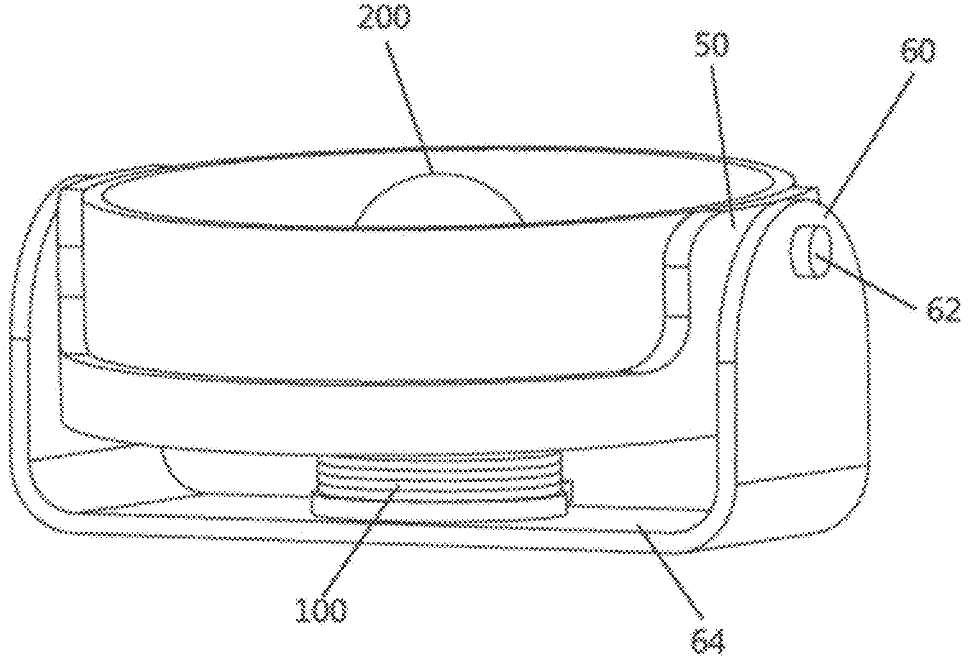
FIG. 19 is a side perspective view of a motion generator of the present technology of the type shown in FIG. 17.
Figure 20:
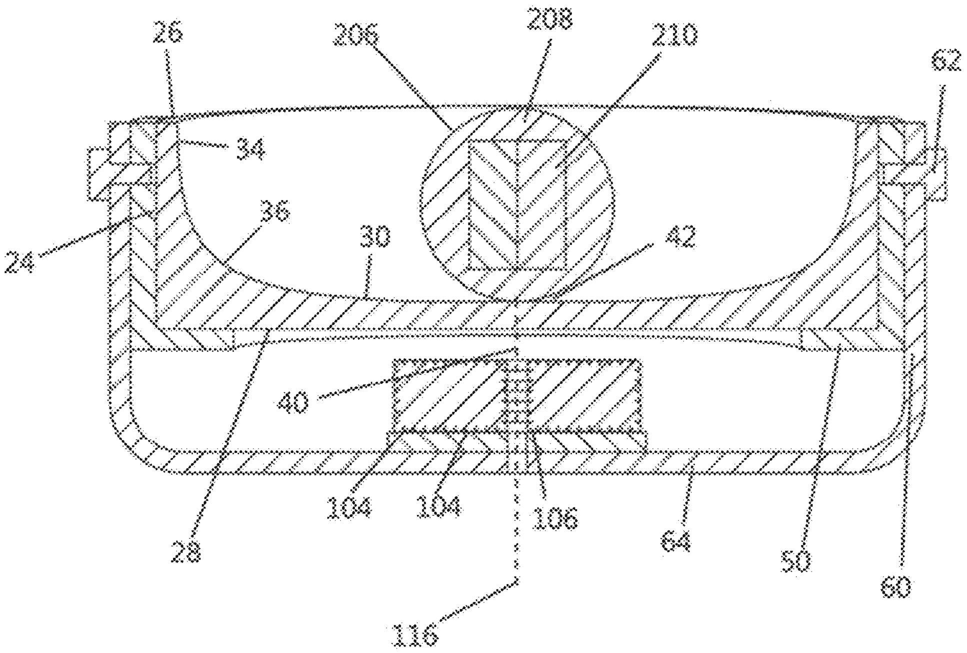
FIG. 20 is a partial sectional side view of a motion generator of the present technology of the type shown in FIG. 17.

This embodiment of the motion generator 10 can include two or more electromagnetic coils 100 positioned along the side of the container 20 and spaced orthogonally with respect to each other. Each coil includes several windings 104 of a continuous wire 106 that winds outwardly from a coreless or air core 114. The ends of the coiled windings 104 are coupled to electrical contact or conductor pads 110. A low voltage power supply can be electrically coupled to the pads to thereby cause a flow of electrons through the coil windings 104. Power can be supplied to the two coils simultaneously or can alternate between the two coils. When electrons flow through the coil a magnetic field is established associated with each coil. The object 200 can have a spherical outer surface 206. FIGS. 13, 15 and 16 illustrate a disc magnet 210 that is embedded in an encasement 208 having a spherical outer surface 206. Alternatively, the object can have a spherical shape and made from a permanent magnetic material or can be made from a material having magnetically responsive properties (see FIGS. 12 and 14).

Referring next to FIGS. 17-20 a motion generator 10 is illustrated that confines a magnetically reactive object 200 within a boundary defined by a container, base or housing 20. In this embodiment, the container 20 is shown supported by a container mounting base 50 and rotationally attached at joint 62 to a gimbal 60 defining a first axis. The joint 62 allows for the container to rotate about the first axis. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 can be chamfered or otherwise curved between the upper top ledge 26 and the bottom portion 30. Further, the bottom portion 30 can curve upward from the center region 40. Alternatively, the bottom portion 30 can include an upward extending bump 42 that prevents a magnetic axis of object 200 from aligning with a polar axis 116 of coil 100. Such misalignment ensures that object 200 will move from a rest position/orientation when coil 100 is energized.

Figure 29:
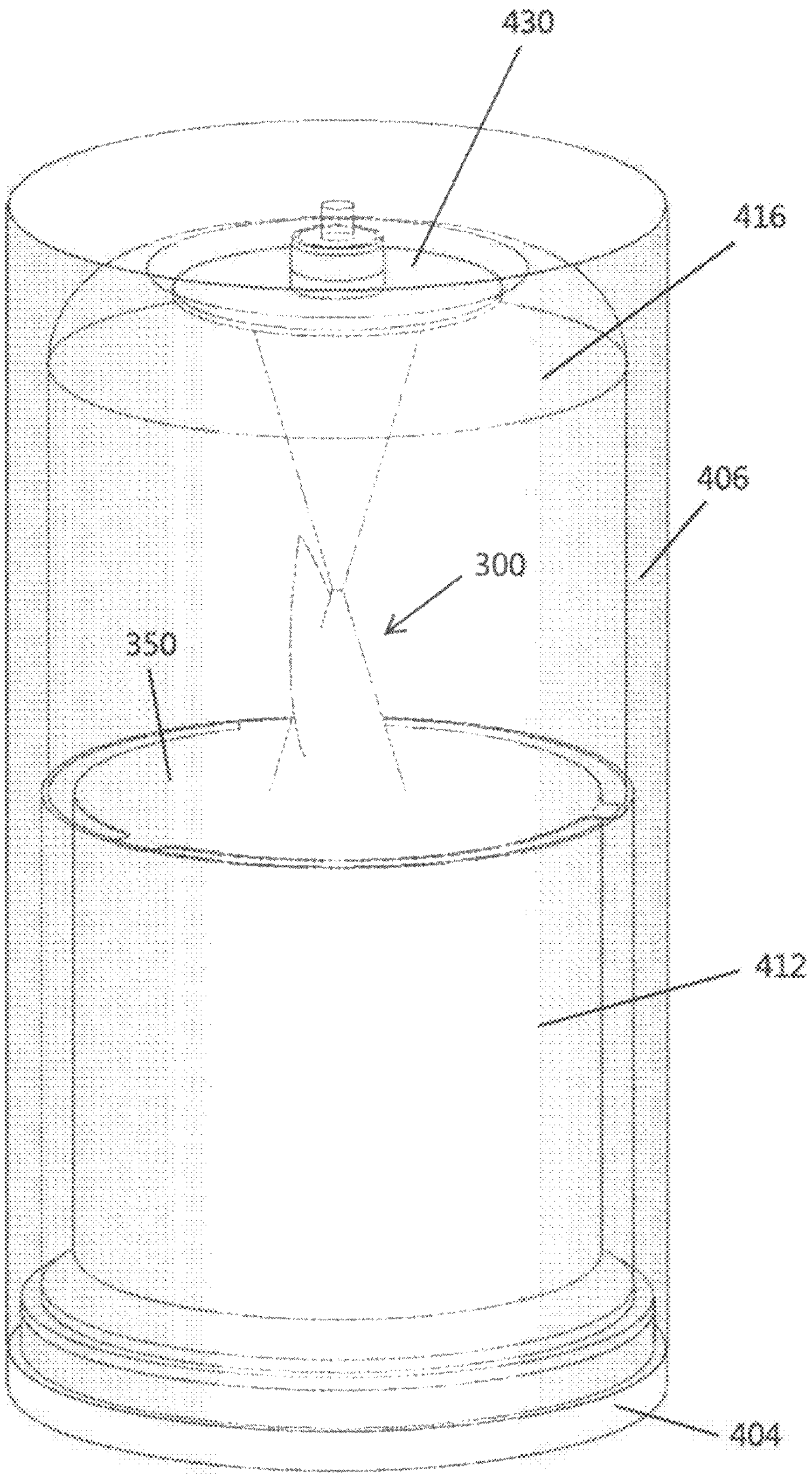
FIG. 29 is a back partial transparent perspective view of an enclosed artificial candle embodiment of the type shown in FIG. 28.

This embodiment of the motion generator 10 includes a single electromagnetic coil 100 fixed to the base 64 of the first gimbal 60. The coil includes several windings 104 of a continuous wire 106. The ends of the coiled windings 104 are coupled to electrical contact or conductor pads 110. A low voltage power supply can be electrically coupled to the pads to thereby cause a flow of electrons through the coil windings 104. When electrons flow through the coil 100, a magnetic field is established. A central core of the windings can be hollow or filled with air. The center of the base mount 50 can be removed to reduce the amount of material separating the magnetic field and the object 200. The object 200 can have a spherical outer surface 206. FIGS. 27 and 29 illustrate a disc magnet 210 that is embedded in an encasement 208 having a spherical outer surface 206. Alternatively, the object can have a spherical or non-spherical shape and made from a permanent magnetic material or can be made from a material having magnetically responsive properties (see FIG. 26).

The shape of the object together with the nonplanar, curved bottom 30 of the container 20 and gravitational forces cause the object to come to rest at a rest position/orientation, which can be in the middle or center 40 of the container 20 when no magnetic field from the coil 100 is present. The rest position/orientation, however, can instead be non-centered. When electricity passes through the coil windings 104 a magnetic field results that acts upon the magnetically reactive object 200 and displaces the object from the rest position 40 of the container. The non-planar inner surface 34 at the bottom portion 30 of the container 20 causes the object 200 to move along surface 34 responsive to the applied magnetic field in an ever-changing pattern of motion. As the object 200 is displaced along surface 34, the mass of the object 200 causes the container 20 to pivot about joint 62. When the object 200 includes a magnetic field of its own, the magnetic moment of the object 200 and the magnetic moment of an active electromagnetic coil 100 interact, further causing the object 200 to move along surface 34 of the container 20, preferably in non-linear, randomized directions. Depending upon the direction of the current through the electromagnetic coil 100 and the orientation of the magnetic moment of the object 200, the object can be attracted toward or pushed away from the polar axis 116 of the coil. As the object 200 moves, the orientation of the magnetic moment of the object 200 is ever-changing, which further contributes to the motion of an ever-changing pattern. Also, the motion is further compounded by the gravitational forces acting upon the object 200 as it moves about on the curved surface 34 of the container 20.

Figure 21:
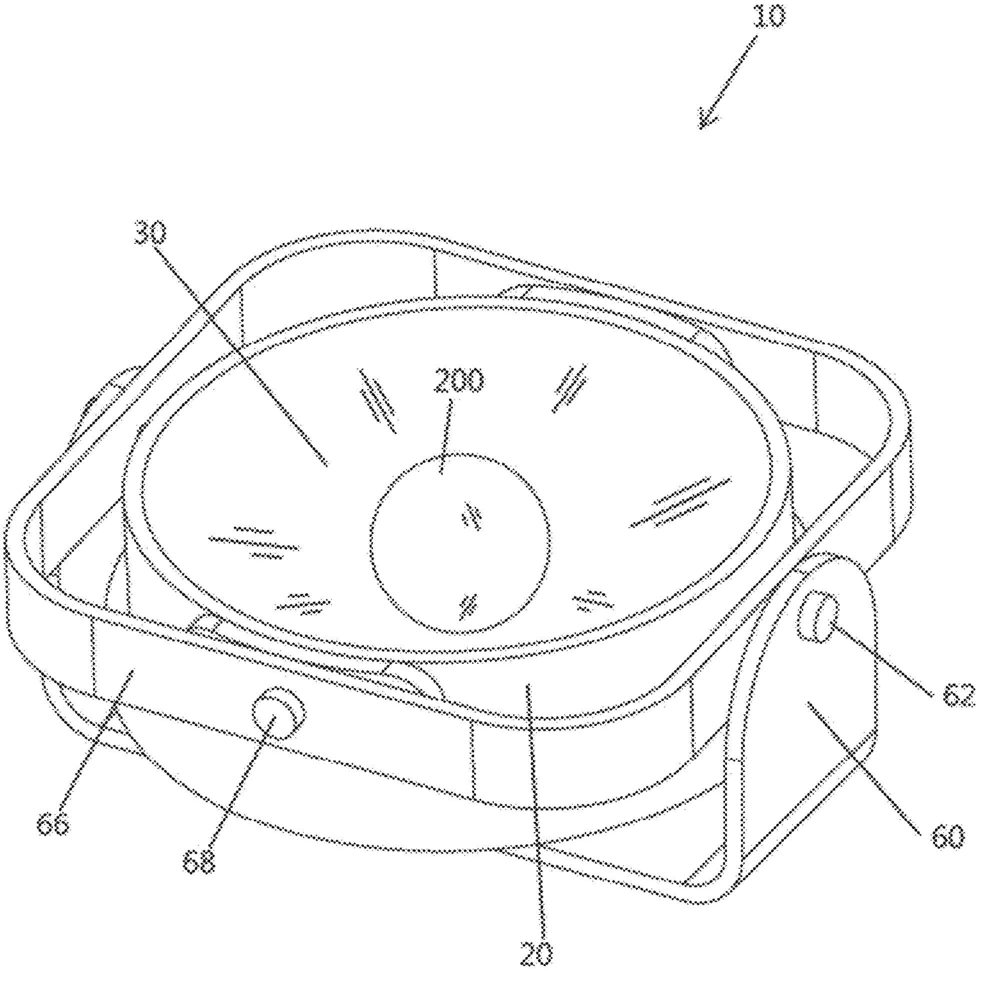
FIG. 21 is a top perspective view of a motion generator embodiment of the present technology shown with multi axis gimbaled confinement.
Figure 22:
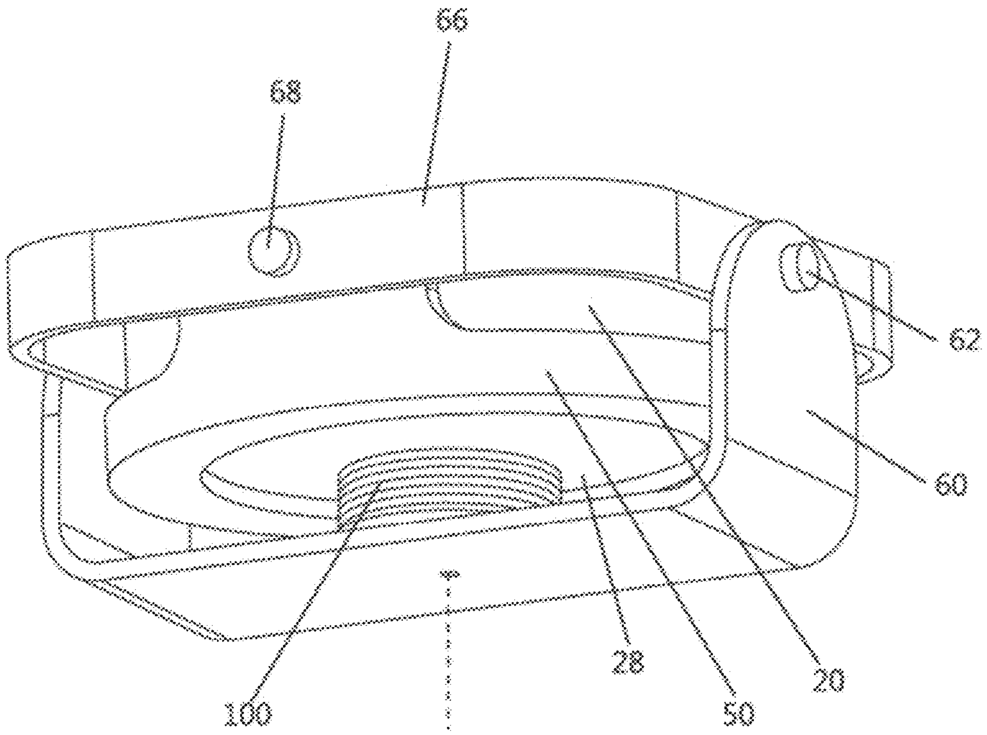
FIG. 22 is a bottom perspective view of a motion generator of the present technology of the type shown in FIG. 21.
Figure 23:
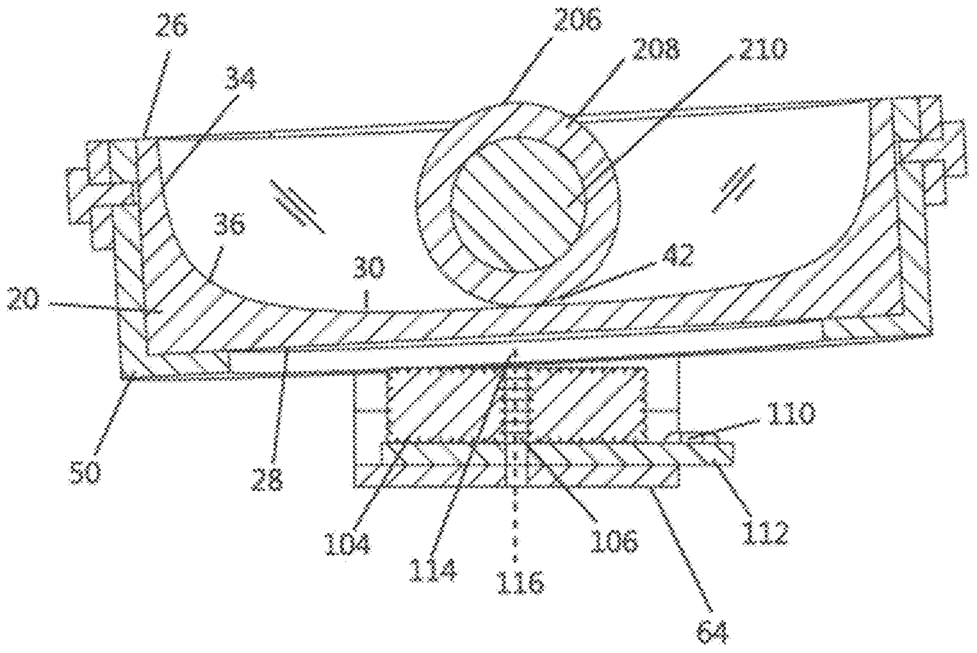
FIG. 23 is a partial sectional side view of a motion generator of the present technology of the type shown in FIG. 21.

Referring next to FIGS. 21-23 a motion generator 10 is illustrated that confines a magnetically reactive object 200 within a boundary defined by a container, base or housing 20. In this embodiment, the container 20 is shown supported by a container mounting base 50 and rotationally attached at joint 62 to a first gimbal 60 defining a first axis. The joint 62 allows for the container 20 to rotate about the first axis. The first gimbal 60 is rotationally attached to a second gimbal 66 at joint 68 to allow rotation about a second orthogonal axis defined by joint 68. In other embodiments, one or more pivot axes can be defined by structures other than a gimbal. The container and gimbals are further supported by base 64. The container 20 includes an exterior sidewall 24 that extends between a lower or bottom portion 28 and an upper top ledge 26 of the container. An interior surface 34 extends between the upper top ledge 26 and nonplanar and curved bottom portion 30. Surface 34 can be chamfered or otherwise curved between the upper top ledge 26 and the bottom portion 30. Further, the bottom portion 30 can curve upward from the center region 40. Alternatively, the non-planar bottom portion 30 can include an upwardly extending bump 42 that prevents a magnetic axis of object 200 from aligning with a polar axis 116 of coil 100. Such misalignment ensures that object 200 will move from the rest position/orientation when coil 100 is energized.

Figure 30:
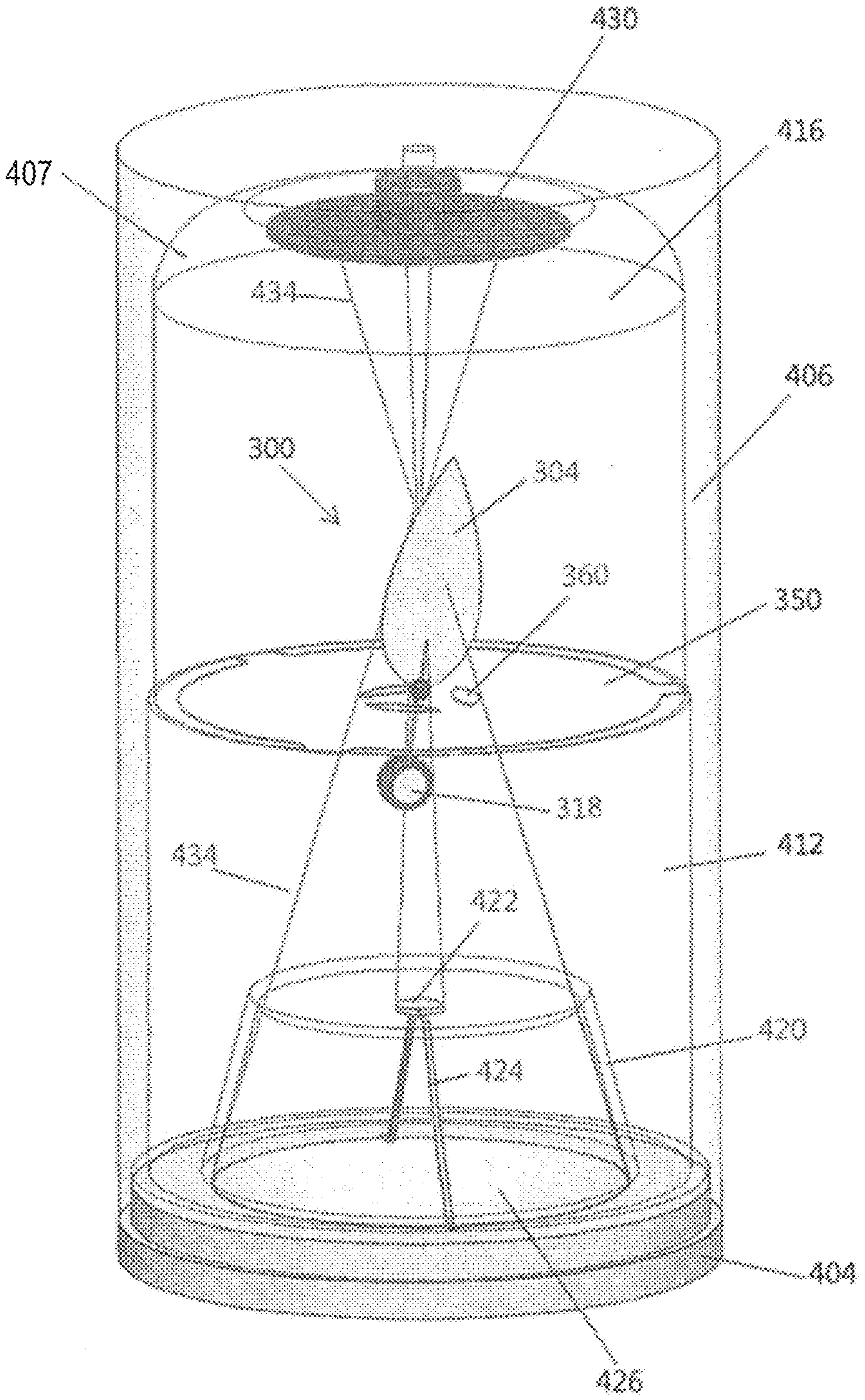
FIG. 30 is a partial transparent perspective view of an enclosed artificial candle embodiment of the type shown in FIG. 28.
Figure 31:
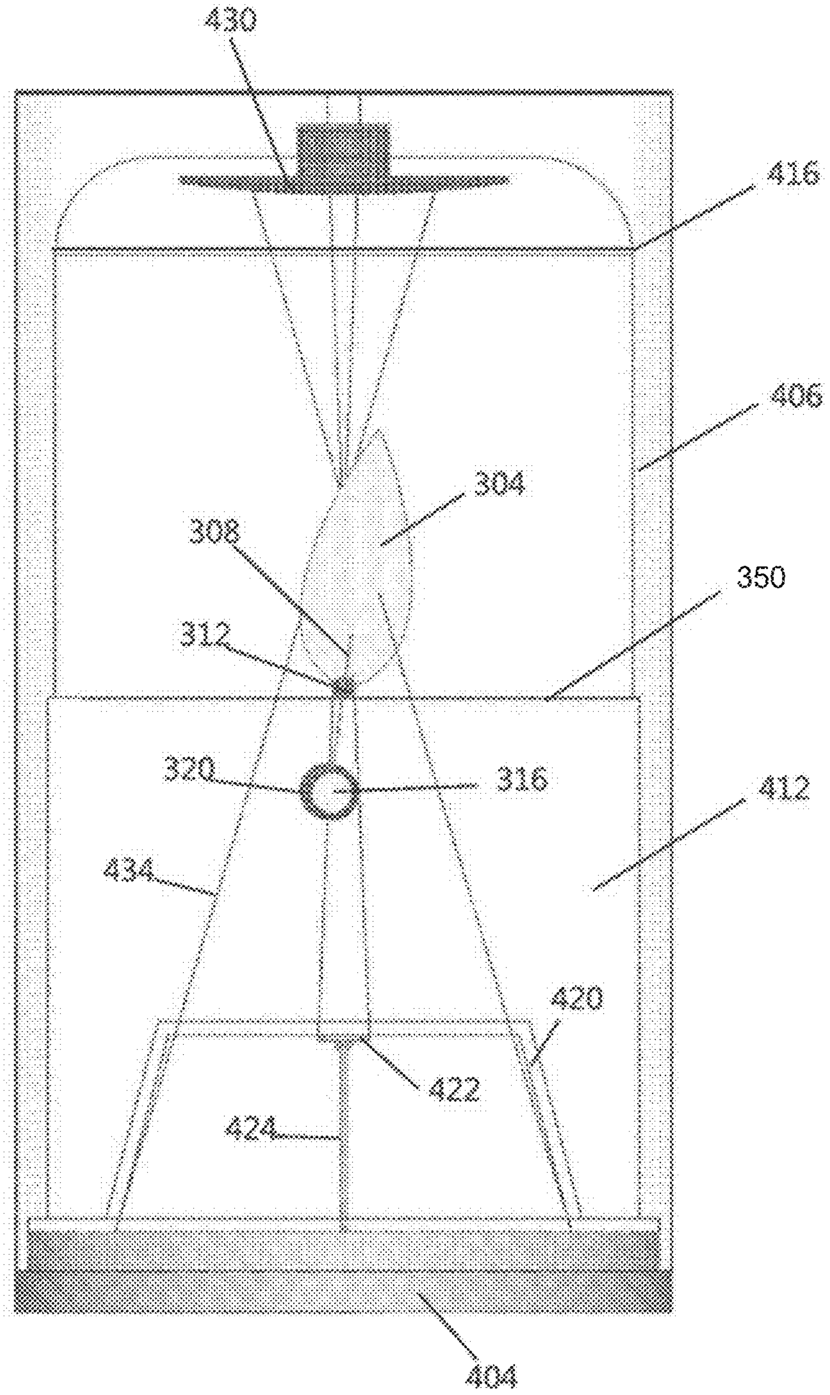
FIG. 31 is a partial transparent side perspective view of an enclosed artificial candle embodiment of the type shown in FIG. 28.
Figure 32:
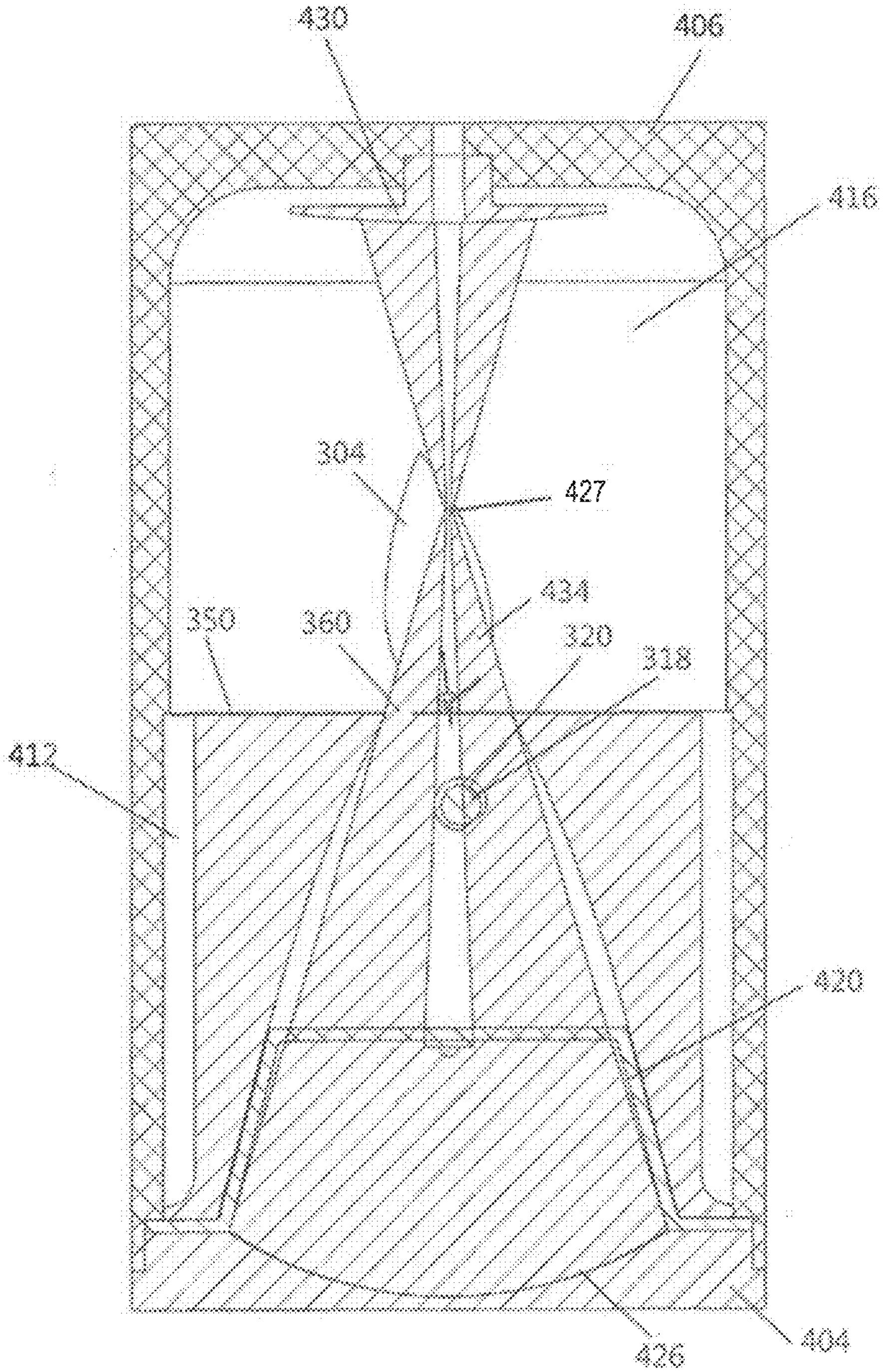
FIG. 32 is a partial sectional side view of an enclosed artificial candle embodiment of the type shown in FIG. 28.

This embodiment of the motion generator 10 includes a single electromagnetic coil 100 fixed to the base 64 of the first gimbal 60. The coil 100 includes several windings 104 of a continuous wire 106. The ends of the coiled windings 104 are coupled to electrical contact or conductor pads 110. A low voltage power supply can be electrically coupled to the pads to thereby cause a flow of electrons through the coil windings 104. When electrons flow through the coil 100, a magnetic field is established. A central core of the windings can be hollow or filled with air. The center of the base mount 50 can be removed to reduce the amount of material separating the magnetic field and the object 200. The object 200 has a spherical outer surface 206. FIG. 32 illustrates a disc magnet 210 that is embedded in an encasement 208 having a spherical outer surface 206. Alternatively, the object can have a non-spherical or spherical shape and made from a permanent magnetic material or can be made from a material having magnetically responsive properties (see FIG. 30).

The shape of the object 200, together with the shape of the surface 34 of the container 20, the pivot joints 62, 68 of the container 20, and gravitational forces cause the object 200 to come to rest at a rest position/orientation, which can be in the middle or center 40 of the container 20 when no magnetic field from the coil 100 is present. The rest position/orientation, however, can instead be non-centered. When electricity passes through the coil windings 104 a magnetic field results that acts upon the magnetically responsive object 200 and displaces the object from the rest position of the container. The non-planar surface 34 of the container 20 facilitates randomized motion that is responsive to the applied magnetic field. As the object is displaced within the container, the mass of the object 200 causes the container 20 to rotate about one or more of pivot axes 62, 68. When the object 200 exerts a magnetic field of its own, the magnetic moment of the object 200 and the magnetic moment of an active electromagnetic coil 100 interact, further causing the object 200 to move along surface 34 of the container 20, preferably in non-linear, randomized directions. Depending upon the direction of the current through the electromagnetic coil and the orientation of the magnetic moment of the object, the object 200 can be attracted toward or pushed away from the polar axis 116 of the coil. As the object moves, the orientation of the magnetic moment of the object can be ever-changing which further contributes to the motion of an ever-changing pattern and displacement. Also, the motion is further compounded by the gravitational forces acting upon the object 200 as it moves along surface 34 of the container 20 and the container 20 pivots about the one or more pivot axes 62, 68.

Figure 24:
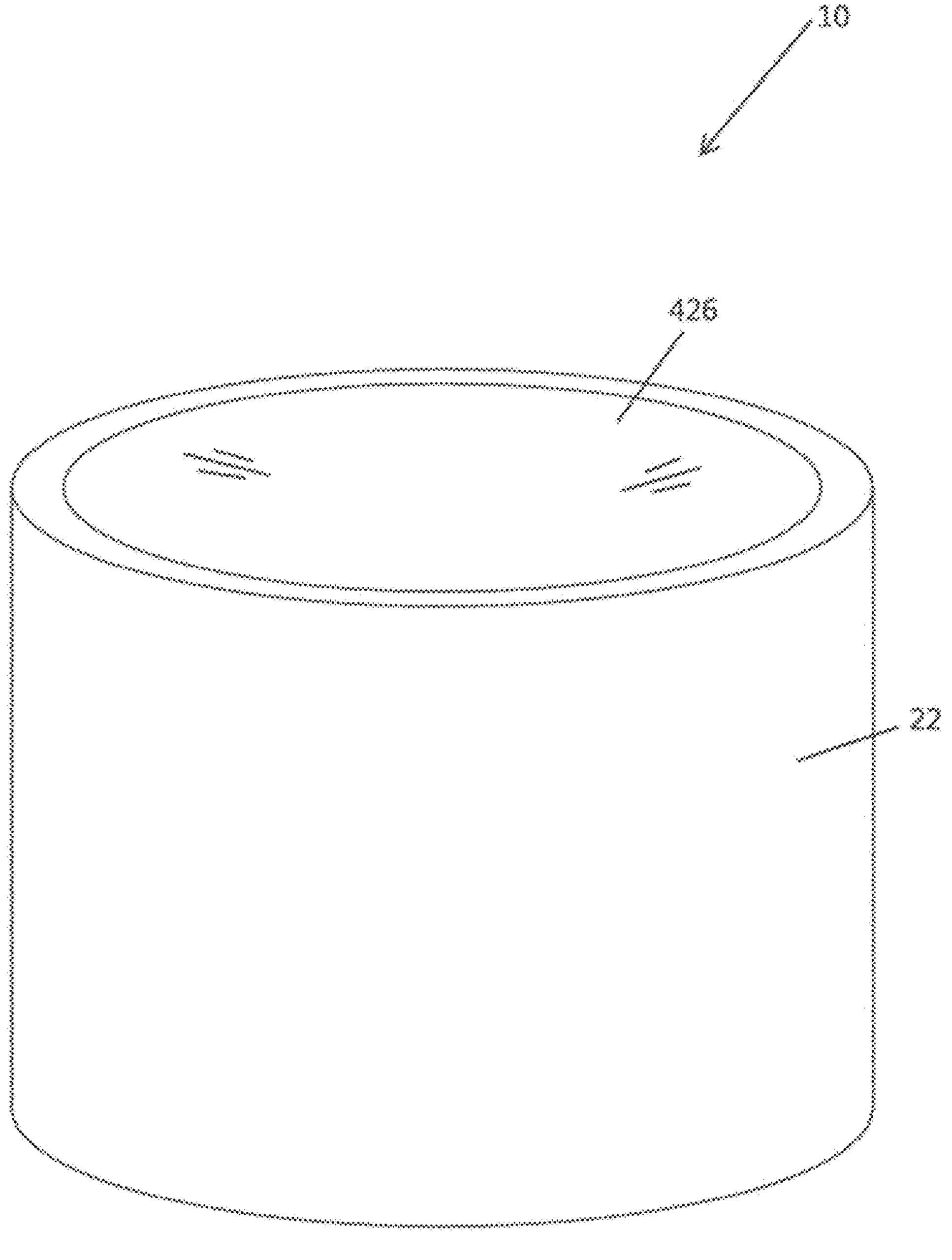
FIG. 24 is a top perspective view of a motion generator embodiment of the present technology shown with enclosed moving confinement.
Figure 25:
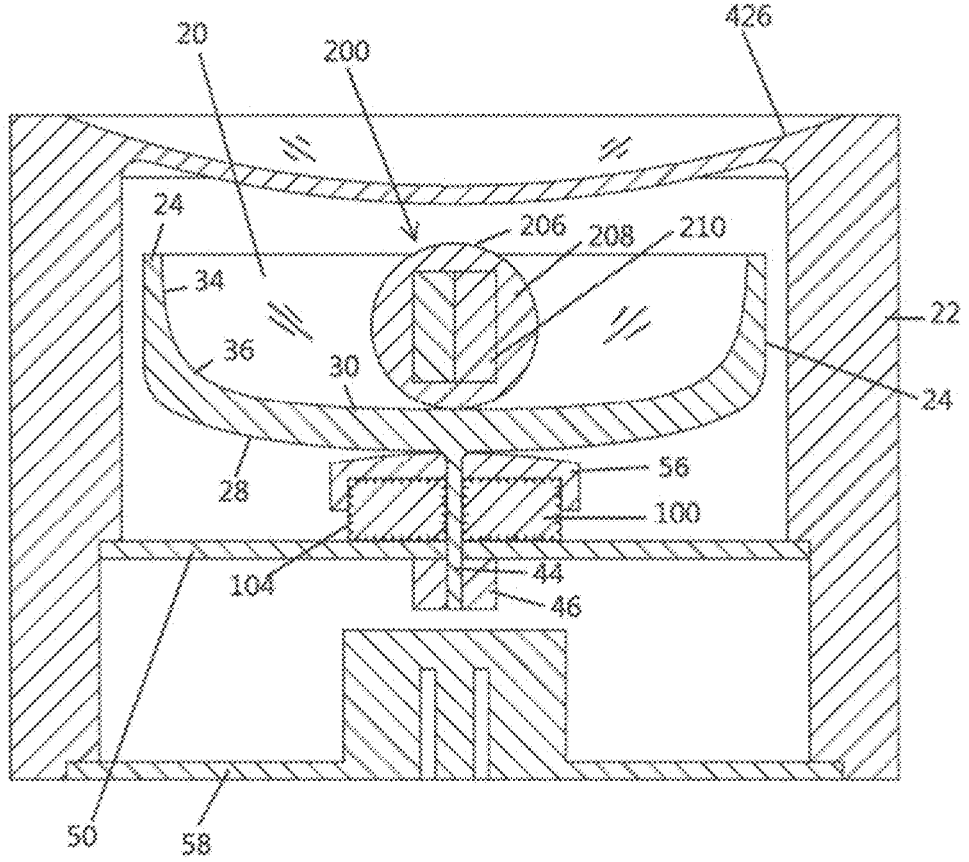
FIG. 25 is a partial sectional side view of a motion generator of the present technology of the type shown in FIG. 24.

With reference to FIGS. 24-25 a motion generator 10 is illustrated having a container, base or housing 20 that confines a magnetically responsive object 200 within a boundary defined by the container. In this embodiment, a cover or top 22 is sealed to the base 50 and a bottom plate 58. The top of cover 22 can be transparent or can be made concave with a mirror surface 426. The container 20 is shown supported by a dome 56 extending upward from coil 100 and mounting base 50. The container 20 includes an elastic stem 44 extending from the bottom of the container. The stem 44 extends through an aperture in the dome 56 and coil 100. A free end of the elastic stem 44 is fixed to the base 50 with retainer 46. The elastic stem 44 is tensioned so that the bottom of the container presses against the dome 56 but remains flexible enough to allow the container 20 to wobble about the dome with several degrees of freedom as the object 200 is displaced within the container. The container 20 includes an exterior sidewall 24 that extends between a lower or bottom portion 28 and an upper top ledge 26 of the container. A surface 34 extends between the upper top ledge 26 and a nonplanar and curved bottom portion 30. Surface 34 is chamfered or otherwise curved between the upper top ledge 26 and the bottom portion 30. Further, the bottom portion 30 can curve upward from a center region of the container.

This embodiment of the motion generator 10 includes a single electromagnetic coil 100 fixed to the mounting base 50 under the container 20. The coil includes several windings 104 of a continuous wire. The opposing ends of the coiled windings 104 are coupled to electrical contact or conductor pads. A low voltage power supply can be electrically coupled to the pads to thereby cause a flow of electrons through the coil windings 104. When electrons flow through the coil a magnetic field is established. A central core of the windings can be hollow or filled with air. In some embodiments, the polar axis 116 of the coil windings 104 of the continuous wire is aligned with the center of the housing 20. The object 200 can have a spherical or non-spherical outer surface 206. FIG. 25 illustrates a disc magnet 210 that is embedded in an encasement 208 having a spherical outer surface 206.

The shape of the object together with the nonplanar, curved surface 34 of the container 20 and gravitational forces cause the object to come to rest at a rest position, which can be the middle or center of the container 20, when no magnetic field from the coil 100 is present. The rest position/orientation, however, can instead be non-centered. When electricity passes through the coil windings 104, a magnetic field results that acts upon the magnetically responsive object 200 and displaces the object from the rest position 40 of the container. Surface 34 facilitates randomized motion of object 200 under an applied magnetic field. When the object 200 exerts a magnetic field of its own, the magnetic moment of the object and the magnetic moment of an active electromagnetic coil 100 interact, further causing the object to move upon surface 34 in randomized. Depending upon the direction of the current through the electromagnetic coil 100 and the orientation of the magnetic moment of the object 200, the object can be attracted toward or pushed away from the polar axis 116 of the coil 100. As the object 200 moves, the orientation of the magnetic moment of the object is ever changing as the container 20 wobbles about an axis defined by stem 44, further contributing to the motion of an ever-changing pattern. Also, the motion is further compounded by the gravitational forces acting upon the object 200 as it moves along surface 34 of the wobbling container 20.

Additional example motion generators are described in U.S. application Ser. No. 18/677,638, filed May 29, 2024, the content of which is incorporated herein by reference in its entirety.

Figure 26:
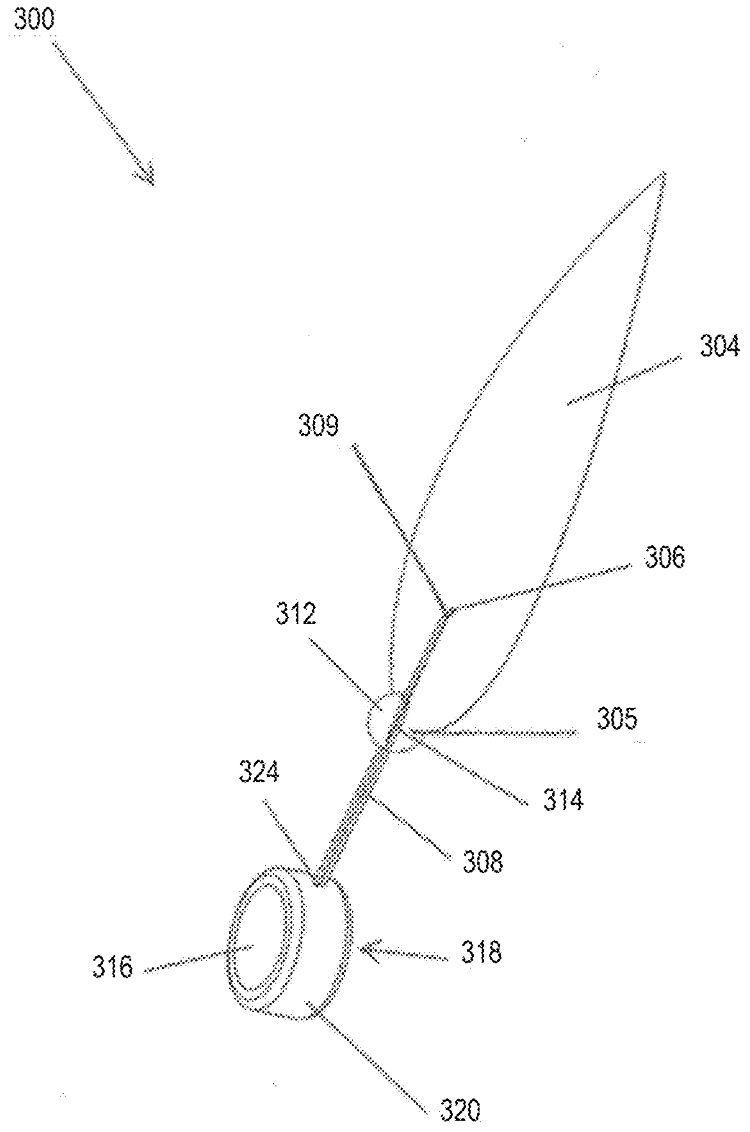
FIG. 26 is a perspective view of an artificial flame assembly embodiment suitable for use in an artificial candle of the present technology.
Figure 27A:
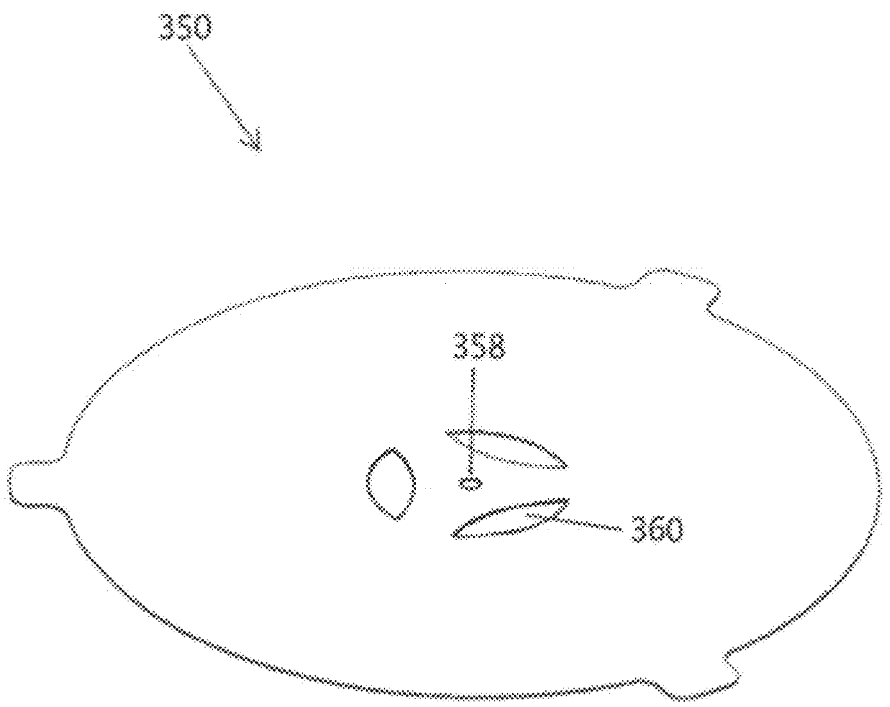
FIG. 27A is a perspective view of a platform for an artificial flame assembly embodiment suitable for use in an artificial candle of the present technology.
Figure 27B:
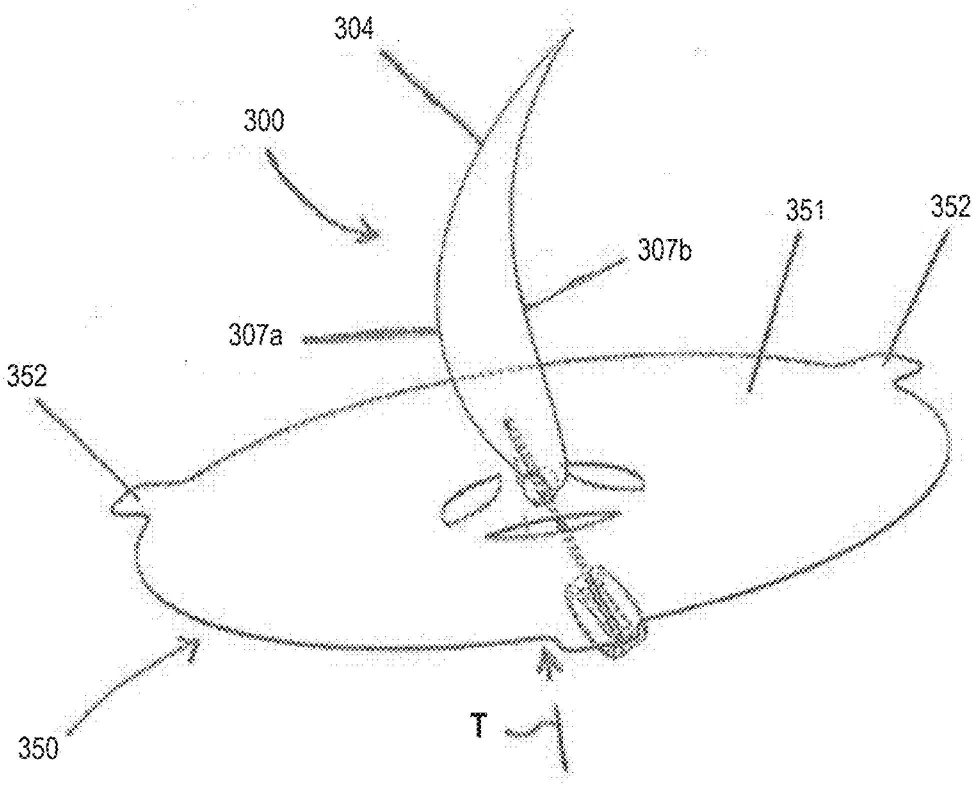
FIG. 27B is a perspective view of an artificial flame assembly with the platform of FIG. 27A.
Figure 28:
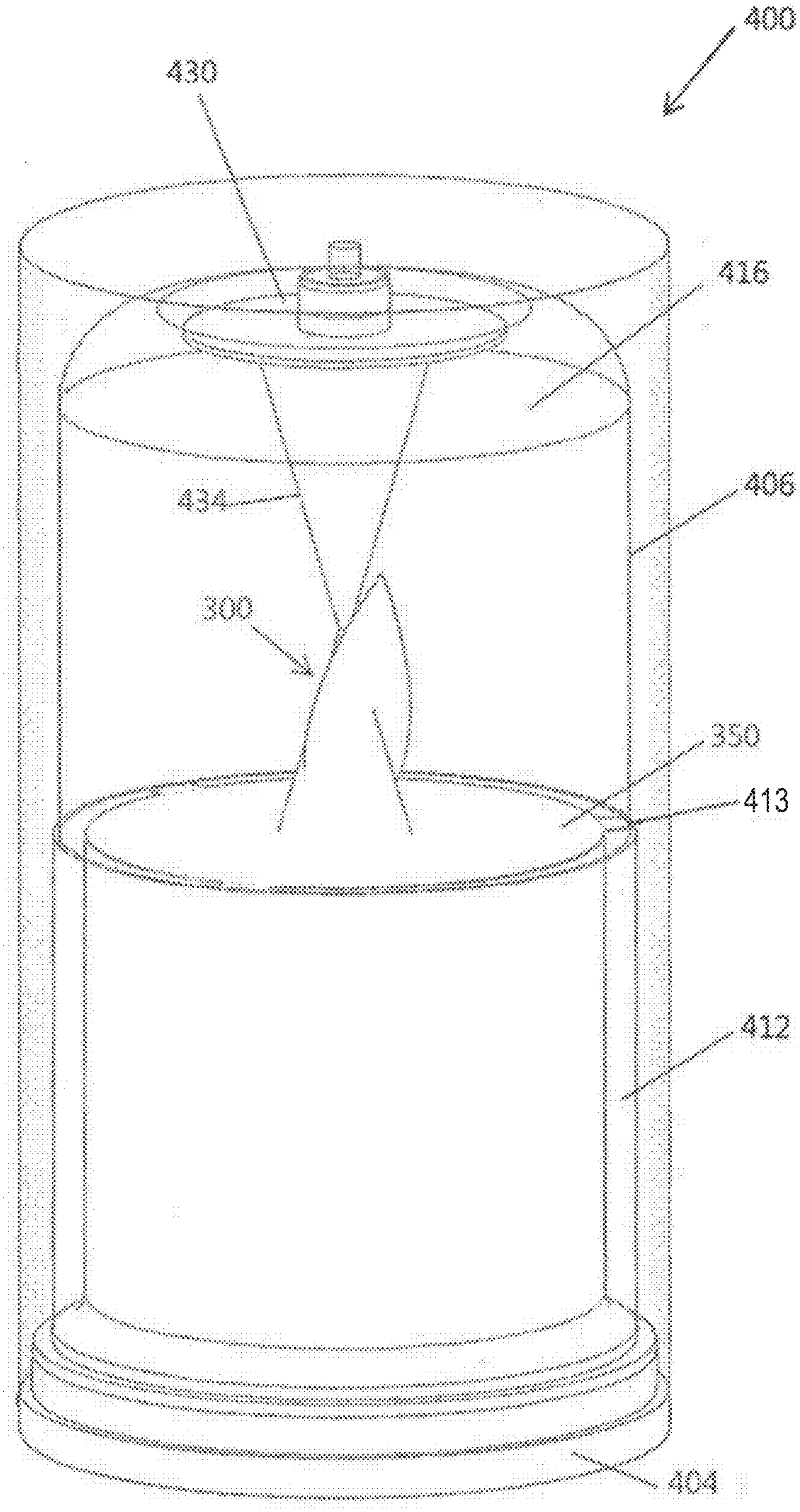
FIG. 28 is a front partial transparent perspective view of an enclosed artificial candle embodiment of the present technology suitable for randomized motion of an artificial flame.

With reference to FIGS. 26, 27A, and 27B, a screen assembly or an illumination assembly 300 and suspension platform or pivot disk 350 are illustrated. The screen assembly 300 includes a screen 304, wire loop 308, pivot object 312, magnet 318, and a magnet holder 320. The screen assembly 300 can be pivotally supported by platform 350. The platform 350 can be mounted adjacent to or near a motion generator 10, such that object 200 can continuously or discontinuously couple with magnet 318 of screen assembly 300. In some embodiments, object 200 can magnetically pair with magnet 318 of screen assembly 300 through a magnetic interaction between object 200 and magnet 318. Object 200 can additionally or instead physically interact with screen assembly 300. Through such coupling, movement of object 200 imparts movement to screen assembly 300. Preferably, the imparted or induced movement is randomized, assuming an ever-changing movement pattern. In this regard, screen assembly 300 is an example of an associated or paired article, which is associated with the motion generator 10 through the continuous or discontinuous coupling between object 200 and screen assembly 300 to provide screen assembly with unique motion characteristics. It is contemplated, however, that a wide variety of shapes, figures, and mechanisms can be employed as the paired article or articles.

In some embodiments, such as when screen 304 of screen assembly 300 is configured with an appearance of a flame, the wire loop 308 can be configured to resemble the wick of a wax candle. In particular, screen can be secured to wire loop 308 so that a distal end 309 of wire loop 308 is spaced from a base end 305 of screen 304. An appearance of a flame emitting from around an end region of a wick is accordingly achieved. Wire loop 308 can be sufficiently rigid to transfer the motion imparted upon magnet 318 to the screen 304. However, wire loop 308 may, in some embodiments, exhibit flexibility in operation to provide a natural appearance of the wick bending or otherwise moving as a result of external forces such as moving air impacting the wick. In some embodiments, wire loop 308 can be fabricated from a relatively thin metal wire that provides the necessary rigidity to effectively transfer motion to screen 304, but can also exhibit a degree of flexibility as described above.

Moreover, the thinness of wire loop 308 can be advantageous to reduce the visible prominence of the wire. An example wire loop 308 can be fabricated from stainless steel, with an example thickness of between 0.05 mm to 0.2 mm. In some embodiments, when a fluid 416 is used in conjunction with the screen assembly 300 (more details are discussed below in connection with FIGS. 38-32), the wire loop 308 can include a flexible material that does not exhibit much rigidity, such as a fabric material, to create a floating effect as the screen 304 floats and moves in the fluid 416. The rigidity of the wire loop 308 can be adapted based on the viscosity of the fluid 416 to achieve the desired floating effect.

Each end of the wire loop 308 can be received through a slot or aperture 306 in screen 304, through an aperture 314 extending through the pivot body 312, through an aperture 358 in the pivot disk 350, and through an opening 324 in the magnet holder 320. Ends of the wire loop 308 can be positioned on opposing sides of a dividing wall within the magnet holder 320, such that when more than one magnet bodies 316 form magnet 318, and are drawn together in the magnet holder 320, the ends of wire loop 308 can be sandwiched between the respective magnet bodies 316 and the dividing wall to be firmly held in place. Other techniques and configurations for securing wire loop 308 with magnet holder 320 are also contemplated by the present technology.

Pivot body 312 is preferably configured to coordinate with suspension platform/pivot disk 350. In the illustrated embodiment, pivot body 312 is supported by pivot disc 350 with wire loop 308 extending though aperture 358. Pivot body 312 stabilizes movement of screen assembly 300 through aperture 358 of pivot disc 350, but is preferably configured to facilitate movement of screen assembly in several degrees of freedom. The interaction of pivot body 312 with pivot disc 350 permits screen assembly 304 to pitch, yaw, slide, and roll in several degrees of freedom, limited axially by the relatively larger sizes of pivot body 312 and magnet holder 320 with respect to aperture 358, and otherwise by the relative size of aperture 358 with respect to a thickness of wire loop 308. In some embodiments, the interaction of pivot body 312 and pivot disc 350 resembles a universal joint that permits several degrees of motion freedom to screen assembly 300, while restricting few degrees of freedom of motion. Pivot body 312 can be spherical, semi-spherical, elliptical, lens-shaped, or any other shape that facilitates desired movement of screen assembly relative to pivot disc 350. A spherical pivot body 312 can provide an advantage of limiting or avoiding significant change to a silhouette or shadow cast by pivot body 312 as it pivots. Other shapes for pivot body 312, however, can also exhibit this optical advantage.

Pivot plate 350 can assume a variety of configurations and be fabricated from a variety of materials. In some embodiments, however, light transmissivity can be an important characteristic of pivot plate 350. Pivot plate 350 can therefore be substantially transparent to electromagnetic radiation, such as radiation having wavelengths within a visible light range, an infrared light range, an ultraviolet light range, and combinations thereof. For the purposes hereof, the term "transparent" can mean having the property of transmitting light through so that objects can be illuminated by the light. In some embodiments, pivot plate can be entirely transparent. In other embodiments, however, only a portion or certain portions of pivot plate 350 can be transparent. As will be described in greater detail hereinbelow, a function of pivot plate 350 can be to permit passage of light along at least a direction "T" through a thickness of pivot plate 350. An example construction of pivot plate 350 can be a visible light-transparent polyester sheet having a thickness along direction "T" of 0.05-0.2 mm. In some embodiments, an upper surface 351 of pivot plate 350 can exhibit light reflective properties, or can have a reflective coating applied thereto. Aperture 358 preferably has a diameter that is smaller than a cross-sectional dimension of pivot body 312.

Pivot plate 350 can also or instead be translucent or semi-transparent to light. For the purposes hereof, the term "translucent" can mean the property of, in the case of visible light, permitting some light through, but diffusing it so that objects are not clearly visible through it. Pivot plate can have some portions which are translucent, and other portions which are transparent or opaque.

The screen assembly 300 and pivot plate 350 are typically positioned in relation to a motion generator 10 such that magnet 318 is responsive to a change in the magnetic field emanating from the motion generator 10 and/or a change in the magnetic field emanating from object 200. In some embodiments, object 200 exerts a magnetic field. As described above, object 200 can be urged into movement by motion generator 10. The movement of object 200 can include rolling, tumbling, spinning, and the like, which causes a polar axis of the magnetic field of object 200 to move correspondingly. The moving magnetic field exerted by object 200 can also cause a magnetic response in magnet 318 of screen assembly 300. The magnetic response of magnet 318 can include spatial displacement responsive to the randomized positioning of object 200 of motion generator 10. Magnet 318, therefore, can itself move in somewhat randomized directions and magnitudes, based upon the movement of object 200 and its relative proximity and spatial relationship to magnet 318 when magnet 318 is magnetically paired with object 200.

In some embodiments, magnet 318 can be magnetically responsive to motion generator 10, but not to object 200. In some embodiments, object 200 can interfere with the magnetic field exerted by motion generator 10, such that the magnetic field can be intermittently modified or blocked as object 200 moves along surface 34 of container 20. Movement of magnet 318 induced by motion generator 10 and/or object 200 results in motion to screen assembly 300. Because wire loop 308 transfers motion from magnet 318 to screen 304, the ever-changing movement pattern induced in magnet 318 from motion generator 10 and/or object 200 can be transferred to screen 304, limited by the degrees of freedom of movement permitted at the universal joint represented by the relationship between pivot body 312 and pivot plate 350.

Screen 304 can preferably comprise a flexible body that is capable of being at least partially illuminated by incident light. For the purposes hereof, the term "light" can mean electromagnetic radiation in one or more wavelength ranges, such as visible, ultraviolet, and infrared wavelength ranges. The flexible body of screen 304 can therefore be diffusive to light. Screen 304 can be shaped to represent an article that is movable directly or indirectly by motion generator 10. In some embodiments, the flexibility of screen 304 is important to its function and appearance. FIGS. 26 and 27B illustrate a screen 304 shaped like a flame. Screen 304 is therefore sufficiently flexible to bend during induced movement of screen assembly 300 to resemble a flickering flame. An example screen 304 is a polyester film having a thickness of between 0.01-0.03 mm. However, other materials and material thicknesses are contemplated as being useful in the manufacture of screen 304. The thickness and the material for the screen 304 can be adjusted to ensure proper movement of the screen 304 to simulate the desired effect. Moreover, screen 304 can be shaped as desired to best accommodate the respective application of the present technology. Accordingly, screen 304 can have various shapes, sizes, materials, flexibilities, light responsiveness, etc.

In the illustrated embodiment, screen 304 is shaped as a modified, asymmetrical crescent, with each side edge 307*a*, 307*b* having a compound curvature with multiple radii. In other embodiments, however, side edges 307*a*, 307*b* can each of a single radius of curvature, whether equivalent to one another or not. The illustrated embodiment of screen 304 is intended to represent a flame.

A coating can be applied to screen 304 to modify illumination or physical properties thereof. Example coatings include light reflective coatings, light diffusive coatings, colorants, decorative coatings, liquid-impermeable coatings, stiffening agents, and so on.

The screen assembly 300 can be encased in liquid to dampen its motion. Dampening the motion of the screen assembly 300 can increase the flexure of screen 304 as the magnet 318 responds to variances in nearby magnetic fields, thereby causing the wire loop 308 to pitch, yaw, and otherwise be driven by the induced movement of magnet 318. The flexibility and shape of the screen 304, along with the viscosity and density of the liquid, and the rapidity and magnitude of induced motion and directional change to screen assembly from motion generator 10 can be selected and controlled such that a desired movement of screen 304 is achieved. In some embodiments, the movement of screen 304 mimics a flickering flame. It has been found that immersion of screen 304 in a relatively viscous fluid such as various liquids facilitates a realistic flickering flame illusion.

With reference to FIGS. 28-32, a screen assembly 300 illustrated as being secured within an illuminated, fluid filled encasement 400. The illustrated apparatus can constitute a waxless candle, wherein the flame is represented by screen 304 illuminated by a light emitter. The screen assembly 300 within the encasement 400 is driven along several degrees of freedom by a motion generator 10. In some embodiments, the encasement 400 can include a base 404, a dome or cover 406, and body 412. Body 412 can be hollow and can be secured between base 404 and cover 406. The pivot plate 350 of the screen assembly 300 can be dimensioned to be supported by a top ledge of the body 412. In particular, tabs 352 of pivot plate 350 can be received in respective recesses 413 of body 412. In this embodiment, the pivot plate 350 can be substantially transparent and optionally includes slots 360. Encasement 400 can be made from materials that aid in presenting a desired appearance for the paired article, in this case screen 304. In some embodiments, dome or cover 406 can in part or wholly be transparent. In other embodiments, dome or cover 406 can in part or wholly be translucent, or can be combinations of transparent, semi-transparent, translucent, and opaque, wherein various regions encasement 400 exhibit different optical properties. Encasement 400 can be shaped, textured, decorated, or otherwise configured to achieve desired optical properties, physical properties, and/or appearance.

In some embodiments, encasement 400 can be substantially cylindrical. In the illustrated embodiment, cover 406 can have a cylindrical side wall that is at least in part transparent. Applicant has determined that the transparent cylindrical side wall can act as a lens to enhance the appearance of screen 304, particularly when screen 304 is illuminated. The lens formed by the cylindrical side wall can magnify the appearance of screen 304, depending upon the location of the screen 304 relative to the center of curvature of the lens and the focus of the lens.

A fluid 416 can be disposed in a chamber defined by and/or within the encasement 400. As described above, the fluid 416 can be a liquid, and preferably exhibits physical properties that enhance the appearance and function of screen apparatus 300. For example, fluid 416 can be selected in part for its viscosity properties, wherein the fluid 416 acts as a movement retardant to screen 304. An increased viscosity in comparison to a gas mixture like air can preferably cause screen to flex more dramatically during than it would otherwise if immersed in air. Applicant has found that the flex imparted upon screen 304 by fluid 416 during movement of the screen 304 driven by motion generator 10 enhances the realistic appearance of a flickering flame. The ideal flexure of screen 304 during movement can be established through combinations of the material or materials, thicknesses, sizes, and shapes of screen 304, the mounting arrangement of screen 304 to wire loop 308, and the viscosity properties of fluid 416. Optimization of these and other factors are contemplated by the present technology to suit the particular application. An example fluid 416 is water, such as deionized water, which is optically transparent and exhibits a viscosity of about 1 cP at 20° C. Other fluid materials, such as various aqueous solutions, and other non-toxic liquids, are contemplated as being useful in the present technology.

A light source 422, such as a light emitting diode, can be supported under screen assembly 300 by a support body 420. Electrical conductors or leads 424 extend from light source 422 toward the base 404. The light source 422 is preferably positioned to emit light in a manner to illuminate screen 304. Applicants contemplate a variety of illumination mechanisms and arrangements that can suitably illuminate screen 304. In some embodiments, a reflective surface 426 can be located below light source 422. Reflective surface 426 can have a convex configuration to direct the light into different directions. Reflective surface 426 can also have a concave configuration, wherein incident light can be reflected by surface 426 toward one or more foci. In a particular embodiment, at least one of the reflected light foci 427 can be at a specific position within chamber 407 defined by cover 406 to provide a desired illumination of screen 304. For example, screen 304 can be between light source and focal point 427. In this arrangement, a desired illumination pattern, such as a conical or triangular illumination pattern can illuminate at least a portion of screen 304. In the case of screen 304 exhibiting an appearance of a flame, the illumination pattern created by the arrangement and configuration of light source 422 and reflective surface 426 can enhance such appearance by mimicking the illuminated boundary of the flame. Screen 304 can also or instead intersect focal point 427. Thus, as screen 304 moves within chamber 407, including with varying degrees of flexure, portions of screen 304 can intersect with foci 427 of reflected light. By directing the emitted light toward foci 427, an intensity of illumination of screen 304 can be enhanced relative to the source intensity. As a result, light source 422 can require less power than would otherwise be required to achieve the illumination effect facilitated by the arrangement of the present technology. It is to be understood, however, that reflected light from light source 422, other than at foci 427, can also intersect with screen 304. In some embodiments, reflective surface 426 can be formed by vacuum metalizing base 404.

In general, the assembly can be constructed by loading and capturing parts at internal contours. Base 404 and support body 420 combine to seal the bottom of cover 406 when bonded in place. An anti-reflective coating can be applied to various surfaces of the apparatus to minimize undesired reflection of the emitted light from light source 422, and to maximize the intensity of light received at screen 304. The anti-reflective coating can be applied, for example, to a lower surface of pivot plate 350, and an underside of support body 420.

In some embodiments, a portion of the emitted light can be intentionally blocked or diffused to enhance the visual appearance of screen 304 and/or portions of or the entirety of the apparatus. For example, light source 422 itself, and magnet 318 and pivot object 312 of the screen assembly 300 can block a portion of the reflected light from reflective surface 426. The light-blocking elements are arranged in the apparatus such that a shadow or shadows cast by the light-blocking elements enhances the visual appearance of the illuminated screen 304, in some cases by creating a dynamic, diffuse shadow pattern on screen 304 that enhances the realistic quality of the flame illusion. In some embodiments, a shadow cast at screen 304 by one or more of the light blocking elements can resemble a candle wick. The apparatus can therefore preferably include one or more light blocking elements in the light path between light source 422 and screen 304.

A treatment or mechanism can also be applied to at least a portion of reflective surface 426, or in a light pathway between light source 22 and screen 304 to in some manner adjust light incident thereto or passing therethrough. In some embodiments, a pigmented region of reflective surface 426 can act as a color filter to adjust a visible wavelength spectrum of light incident to the pigmented region, and reflected from reflected surface 426 superimposed by the pigmented region. Such an arrangement can enhance the appearance of the flame illusion by creating an amber-colored region of illumination at screen 304. The pigmented region/filter can be applied in an annular pattern at reflective surface 426 so that only a portion of reflected light is affected by the pigmented region/filter.

At least a portion of the light that passes through or around screen 304 can be absorbed, diffused, scattered, and/or reflected by shield 430 rather than passing through cover 406. Shield 430 accordingly limits light from emitting through cover 406, and creates an appearance of only screen 304 being illuminated, as though being its own source of light. Shield 430 can therefore exhibit light absorbing properties. Shield 430 can also or instead have a convex surface that acts to scatter any light reflected therefrom, thereby greatly diminishing the light intensity at any single location. In other embodiments, shield 430 can have a concave reflective surface to reflect incident light back toward a focal point at or near screen 304. Doing so further enhances the intensity of light incident upon screen 304.

With reference to FIGS. 33-36B two exemplary embodiments of a lighting device with the combination of a motion generator, screen assembly and encasement. The lighting device can be implemented as a light bulb to allow versatile usage within existing households.

Figure 33:
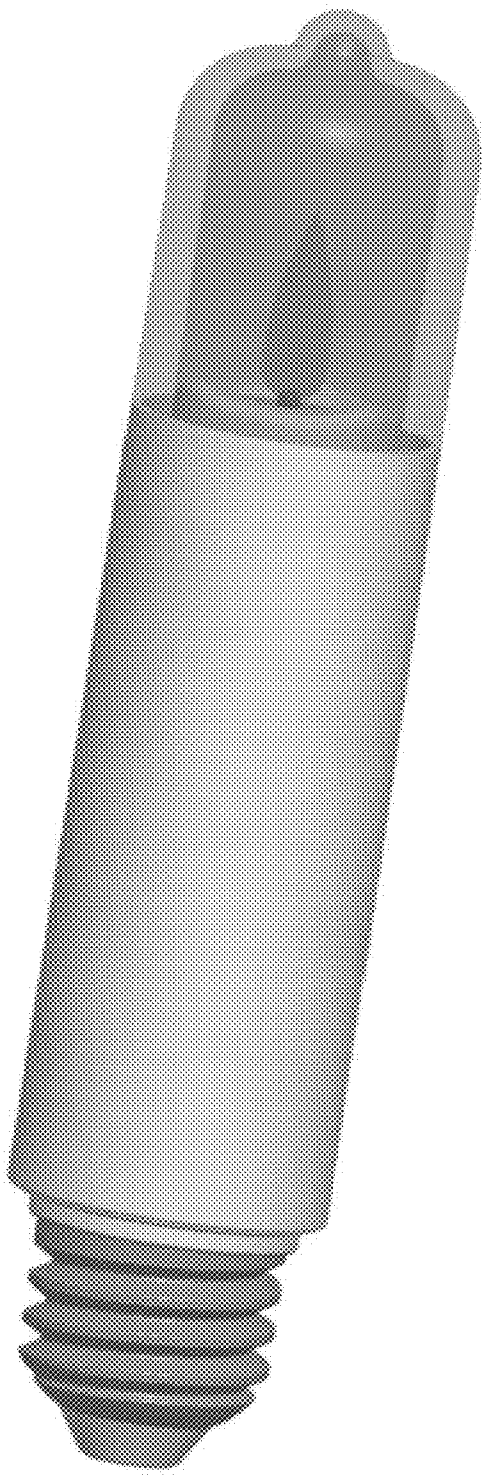
FIG. 33 is a perspective view of an example light bulb in accordance with one or more embodiments of the present technology.
Figure 34A:
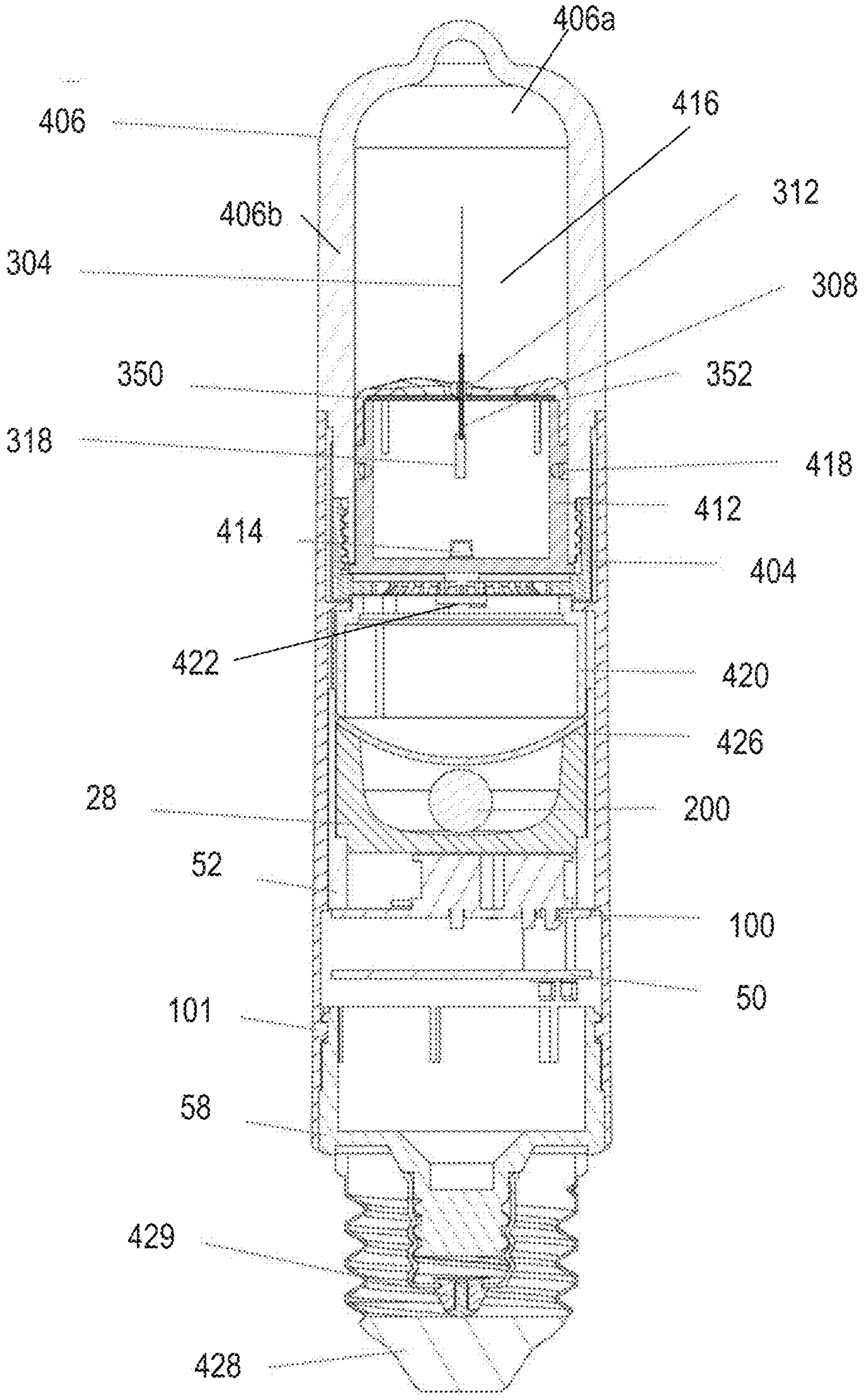
FIG. 34A is a partial transparent side perspective view of an example light bulb shown in FIG. 33.
Figure 34B:
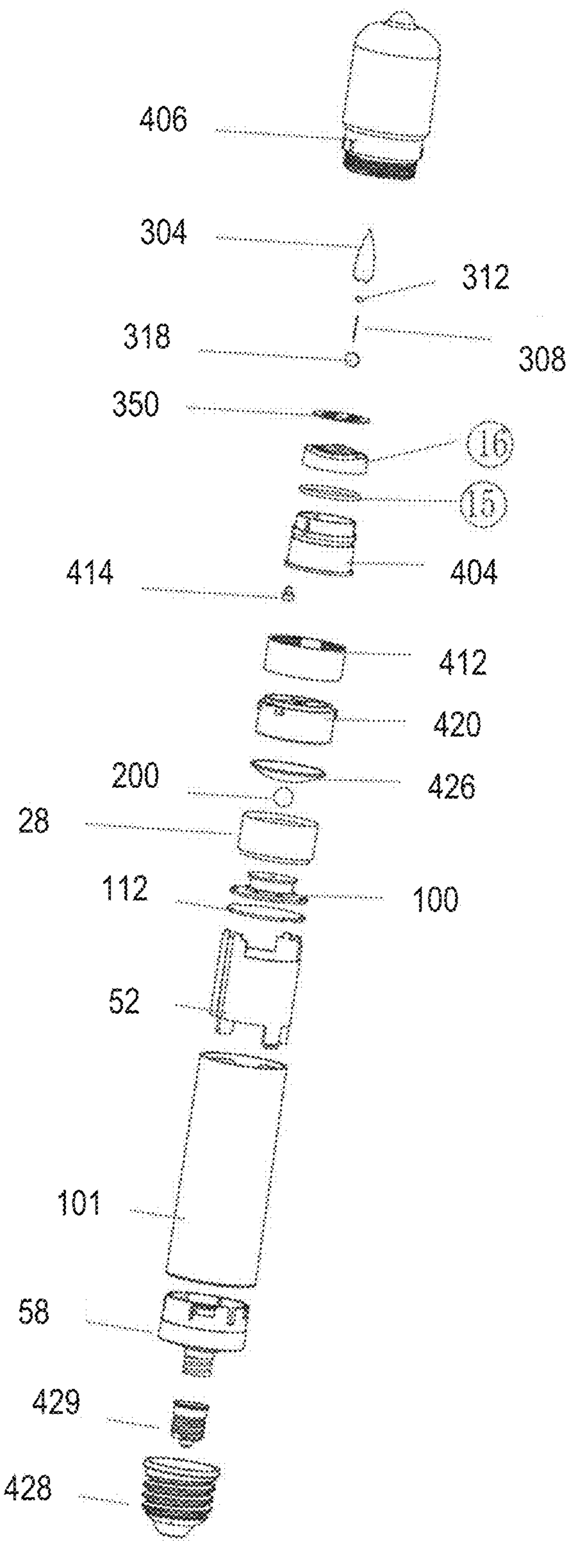
FIG. 34B is an exploded view of an example light bulb shown in FIG. 33.

FIGS. 33-34B shown an example light bulb in accordance with one or more embodiments of the present technology. In the example shown in FIGS. 33-34B, a user can provide low voltage power to the electromagnet coil 100. The object 200 is displaced within a boundary defined by the container. As the object 200 is displaced, a corresponding magnetic field acts upon the magnet 318, causing displacement of the screen 304. The randomized displacement of the screen 304 resembles the random flicker and flutter of a candle flame. Low voltage power can further be delivered to light source 422, and a light beam can be directed downwards towards the reflective surface 426, thereby being reflected and focused on the screen 304. The flicker and flutter of the screen 304 affects the portion of the screen 304, creating a change in illumination that further creates an illusion that the illuminated screen is an active flame.

In this example, the cover 406 is removably decoupled from the base 404 and be separated from the outer shell 101 to allow a fluid 416 to be filled into a chamber formed by the base 404 and the body 412. For example, in some embodiments, the cover 406 comprises two parts: a removable first part 406*a* and a second part 406*b*. When the first part 406*a* is removed from the second part 406*b*, a fluid 416 (e.g., water) can be disposed within the chamber formed by the body 412 and the base 404 (and optionally the second part 406*b* of the cover). In some embodiments, the entire cover 406 is removable from the base 404 to allow the fluid 416 to be filled within the chamber. The fluid 416 can be transparent or translucent with color to enhance ornamental effect. The base 404 includes a plug 414 that prevents the fluid 416 from exiting the body 412 and leaking into other components of the device. In some embodiments, a waterproof ring 418 can be positioned around the body 412 to prevent leakage of the fluid 416 and to stabilize the screen assembly and protect other components of the device (e.g., from movement caused by the screen and/or from short circuit). In some embodiments, the chamber is vacuumed before the fluid 416 is disposed within the chamber to reduce the amount of air bubbles that can be formed during the filling process. When imperfections in the fluid 416 exist after filling, in some embodiments, a portion of the cover 406 is covered by the outer shell 101 and/or is opaque, such that such imperfections (e.g., bubbles) are not visible to users. It is noted that the use of the fluid 416 is optional, and the lighting device can function without any fluid within the chamber.

In some embodiments, the bottom portion 28 and/or the sidewall 24 of the container can include a cover comprising a soundproof material, such as sound barriers, silicone cover, and/or acoustic foam, so as to reduce noise caused by the movement of the magnetically responsive object 200. In some embodiments, the cover comprises one or more damping materials to absorb shock and reduce interference between components of the device, such as between the container and the outer shell 101, and/or the container and the electromagnetic coils.

During operation, the coil 100 can generate a large amount of heat due to resistance in the wire itself. In some embodiments, a metal material or a heat sink can be positioned on or below the mounting base 50 to improve heat dissipation, thereby avoiding overheating other components of the device.

In some embodiments, the bottom plate 58 is shaped to be adaptively coupled to a light bulb base adapter 428, such as E26 bulb base adapter (also referred to as Medium Edison Screw (MES)). The cover 406 can be shaped according to different types of light bulbs, such as capsule light bulbs, candle light bulbs, tube light bulbs, and/or candle angular light bulbs. In some embodiments, additional adaptor(s)/base(s) 429 can be included to allow versatile use of the lighting device.

Figure 35:
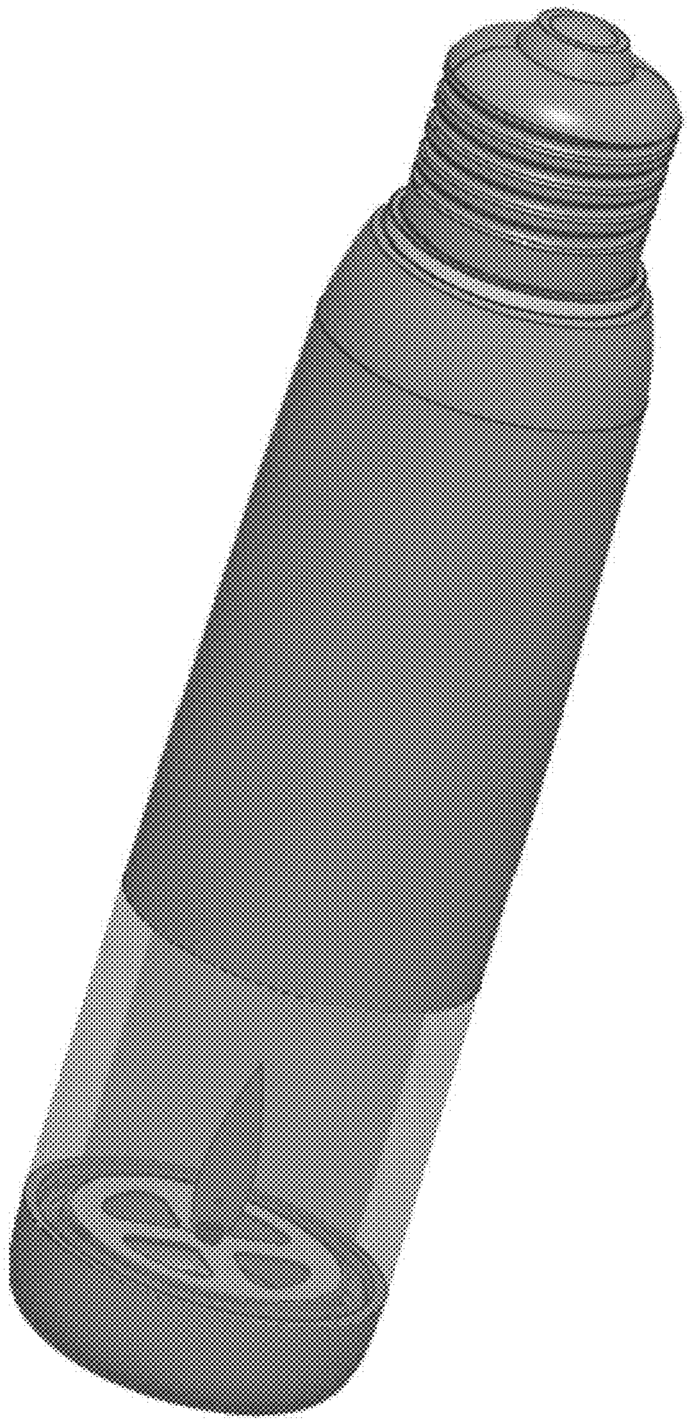
FIG. 35 is a perspective view of an example light bulb in accordance with one or more embodiments of the present technology.
Figure 36A:
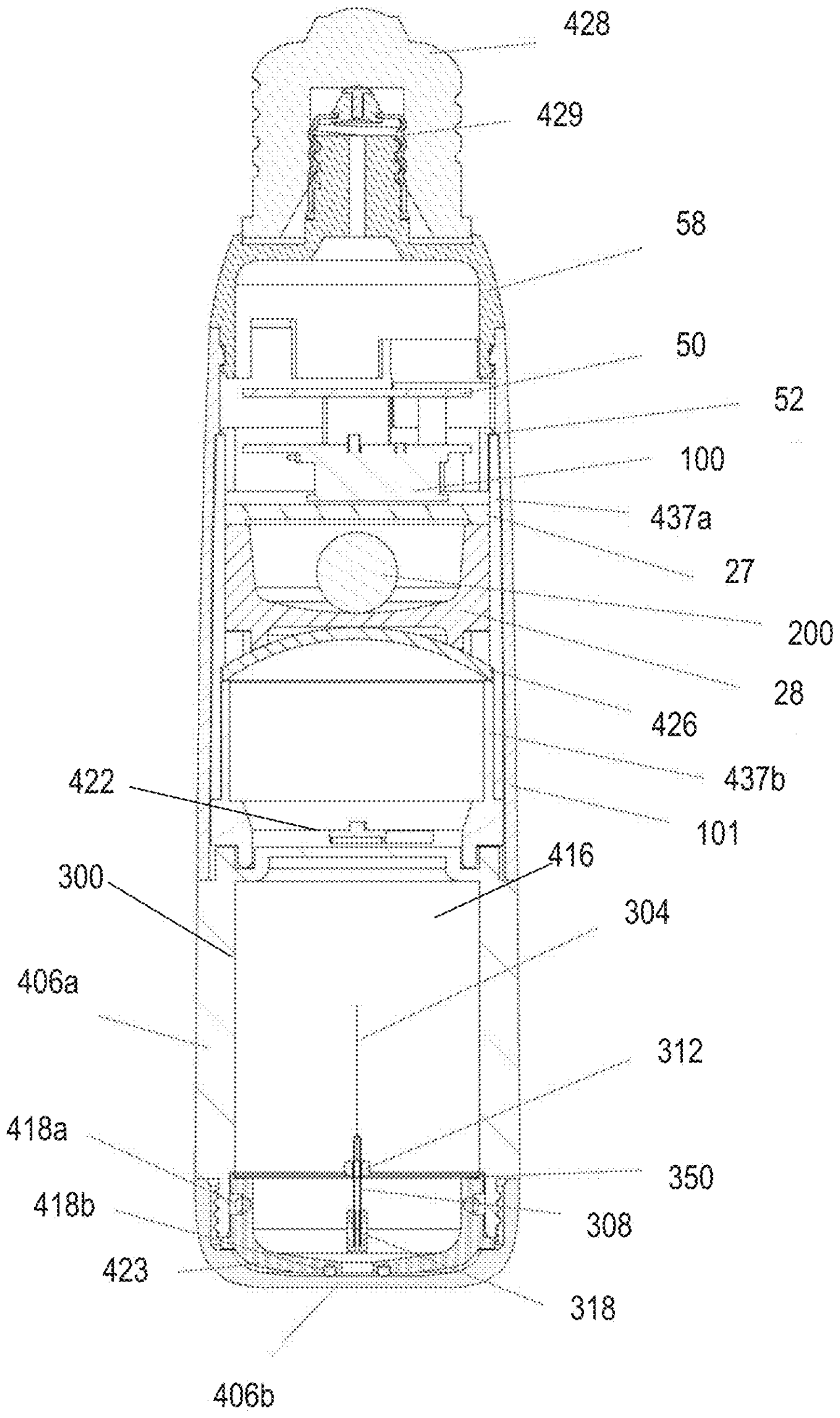
FIG. 36A is a partial transparent side perspective view of an example light bulb shown in FIG. 35.
Figure 36B:
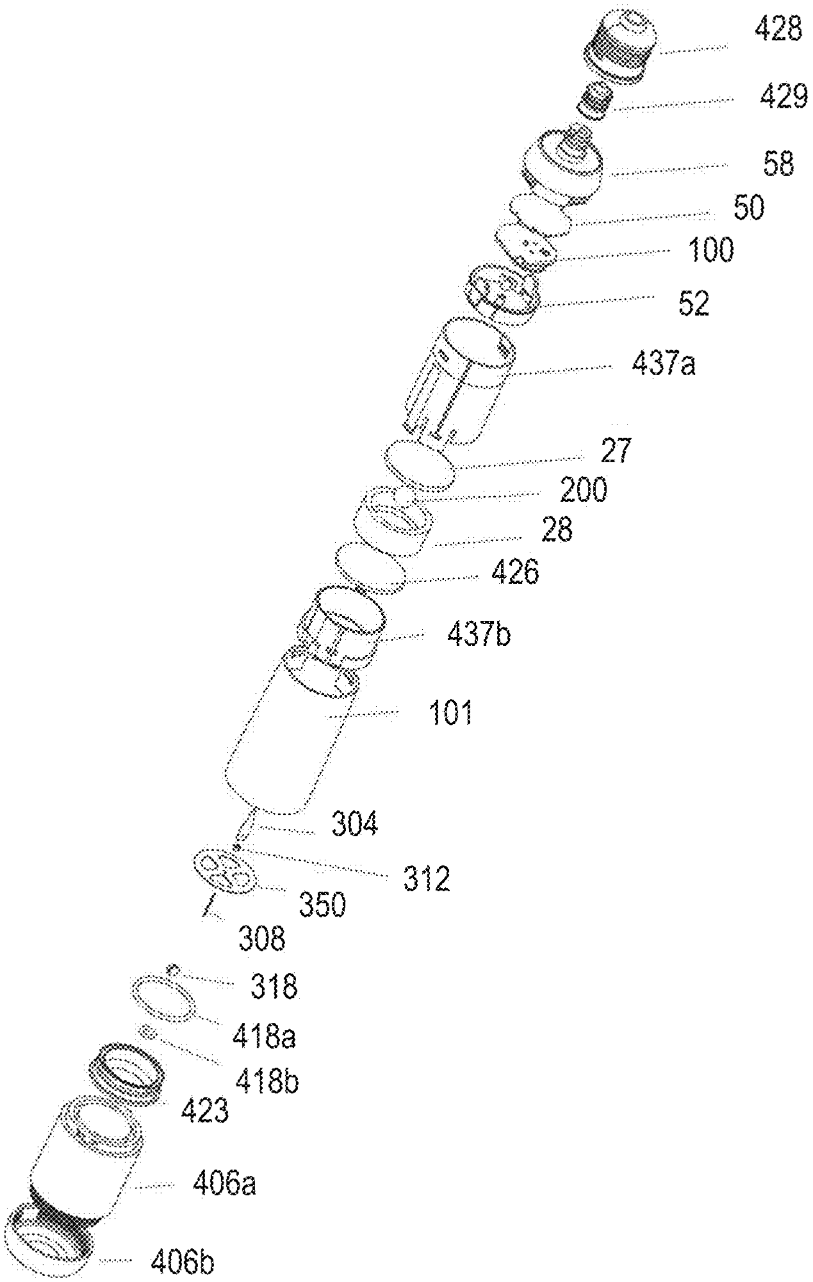
FIG. 36B is an exploded view of an example light bulb shown in FIG. 35.

FIGS. 35-36B shown an example light bulb suitable for a pendant lighting configuration in accordance with one or more embodiments of the present technology. A user can provide low voltage power to the electromagnet coil 100. The object 200 is displaced within a boundary defined by the container. As the object 200 is displaced, a corresponding magnetic field acts upon the magnet 318, causing displacement of the screen 304. The randomized displacement of the screen 304 resembles the random flicker and flutter of a candle flame. Low voltage power can further be delivered to light source 422, and a light beam can be directed upwards towards the reflective surface 426, thereby being reflected and focused on the screen 304 and creating a change in illumination that further creates an illusion that the illuminated screen is an active flame. In this example, the reflective surface 426 is supported by a first support structure 437*a* and a second support structure 437*b* that are coupled to a periphery of the reflective surface 426.

In some embodiments, the bottom portion 28 and/or the sidewall 24 of the container can include a soundproof material, such as sound barriers, silicone cover, and/or acoustic foam, so as to reduce noise caused by the movement of the magnetically responsive object 200. In addition, in some embodiments, a cover 27 is provided above the container. In some embodiments, the bottom or side portion of the container and the cover comprise one or more damping materials to absorb shock and reduce interference between components of the device, such as between the container and the outer shell 101, and/or the container and the electromagnetic coils.

In some embodiments, when the cover is used to enclose/surround the object 200 inside of the container, it is preferably that the object 200 has a smaller size. In some embodiments, it is also preferable to have a smaller object 200 to reduce the shock caused by the movement of the object 200. To compensate the loss of magnetic force due to the smaller size of the object 200, materials having strong magnetic properties (or super magnets), such as neodymium magnets or samarium-cobalt magnets, can be used to ensure proper movement of the object 200.

During operation, the coil 100 can generate a large amount of heat due to resistance in the wire itself. In some embodiments, a metal material or a heat sink can be positioned on or above the mounting base 50 to improve heat dissipation, thereby avoiding overheating other components of the device.

In this example, the cover 406 comprises two parts: a first part **406*a* and a second part 406*b* removably attached to the first part 406*a*. In some embodiments, the second part 406*b* can be coupled to the support structure 423. The first part 406*a* can be transparent, and the second part 406*b* can be opaque to hide the support structure 423. When the second part 406*b* is removed from the first part 406*a*, the support structure 423, along with other parts of the screen assembly, can be detached from the lighting device, and a fluid 416 (e.g., water) can be filled into a chamber in the screen assembly 300. In this example, the screen assembly 300 includes a support structure 423 to support the screen 304 and the suspension platform 350. In some embodiments, one or more waterproof rings (e.g., 418*a*, 418*b*) can be positioned around the support structure 423 to prevent leakage of the fluid 416 and to stabilize the screen assembly 300 when the screen 304 is in motion. In some embodiments, a portion of the first part 406*a* is covered by the outer shell 101 and/or opaque, such that imperfections in the fluid 416**, such as bubbles, are not visible to users.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated can also be present. Other examples will be apparent to those of skill in the art upon reviewing this document.

What is claimed is:

1. A lighting device, comprising:
an outer shell;
a light bulb base adapter;
a bottom plate shaped to be adaptively coupled to the light bulb base adapter;
a mounting base positioned above the bottom plate;
a screen assembly positioned partially within the outer shell, comprising:
a screen shaped to simulate an appearance of a flame,
a suspension platform configured to support the flame,
a body configured to support the suspension platform,
a base, and
a cover removably coupled to the base,
wherein removal of at least of portion of the cover from the base enables a fluid to be filled into a chamber formed by at least the body and the base;
an illumination assembly positioned below the screen assembly, comprising:
a reflective surface, and
a light source positioned above the reflective surface configured to emit light downwards towards the reflective surface such that light beams are reflected by the reflective surface onto the screen; and
a motion generator, comprising:
a container formed by a soundproof material,
an object that is magnetically responsive positioned within the container,
an electromagnet coil positioned below the container, and
a heat sink positioned on or below the mounting base,
wherein, upon a voltage power being applied to the electromagnet coil, the object is configured to move within the container and cause displacement of the screen such that the displacement of the screen resembles movement of a real flame.

2. The lighting device of claim 1, wherein the cover comprises a first part and a second part, and wherein the first part is removably coupled to the second part to enabled the fluid to be filled within the chamber.

3. The lighting device of claim 1, wherein the chamber is vacuumed before the fluid is filled in the chamber.

4. The lighting device of claim 1, wherein at least a portion of the cover is hidden by the outer shell.

5. The lighting device of claim 1, wherein the base comprises a plug configured to prevent the fluid from existing the body.

6. The lighting device of claim 1, wherein the body comprises one or more waterproof rings to stabilize the screen assembly.

7. The lighting device of claim 1, wherein the cover is shaped according to a type of a light bulb.

8. The lighting device of claim 7, wherein the lighting device further comprises one or more additional light bulb base adapters.

9. The lighting device of claim 1, wherein the suspension platform is configured to support the light source via a wire loop, and wherein the wire loop comprises a flexible material that enables the screen to exhibit a floating effect by moving in the fluid.

10. The lighting device of claim 9, wherein a rigidity of the wire loop is based on a viscosity of the fluid.

11. A lighting device, comprising:
an outer shell;
a screen assembly positioned partially within the outer shell, comprising:
a screen shaped to simulate an appearance of a flame,
a suspension platform configured to support the flame,
a support structure configured to support the suspension platform, and
a cover that comprises a first part and a second part coupled to the support structure,
wherein the second part is removably coupled to the first part, and wherein removal of the second part enables a fluid to be filled into a chamber;

an illumination assembly positioned above the screen assembly, comprising:

a reflective surface, and a light source positioned below the reflective surface configured to emit light upwards towards the reflective surface such that light beams are reflected by the reflective surface onto the screen;

a first support structure and a second support structure that are configured to support the reflective surface and extend in length along a longitudinal direction of the lighting device, wherein the first support structure and the second support structure are coupled to a periphery of the reflective surface, and wherein a lower portion of the second structure is in contact with the first support structure; and a motion generator, comprising:

a container formed by a soundproof material, an object that is magnetically responsive positioned within the container, an electromagnet coil positioned above the container, and a heat sink positioned above the electromagnet coil, wherein, upon a voltage power being applied to the electromagnet coil, the object is configured to move within the container and cause displacement of the screen such that the displacement of the screen resembles movement of a real flame.

12. The lighting device of claim 11, wherein the container comprises a cover to surround the object.

13. The lighting device of claim 11, wherein the chamber is vacuumed before the fluid is filled in the chamber.

14. The lighting device of claim 11, wherein at least a portion of the cover is hidden by the outer shell.

15. The lighting device of claim 11, wherein the support structure comprises one or more waterproof rings to stabilize the screen assembly.

16. The lighting device of claim 11, wherein the first part of the cover is transparent, and wherein the second part of the cover is opaque.

17. The lighting device of claim 11, wherein the lighting device further comprises one or more light bulb base adapters.

18. The lighting device of claim 17, wherein the lighting device is used in a pendant lighting configuration.

19. The lighting device of claim 11, wherein the suspension platform is configured to support the light source via a wire loop, and wherein the wire loop comprises a flexible material that enables the screen to exhibit a floating effect by moving in the fluid.

20. The lighting device of claim 19, wherein a rigidity of the wire loop is based on a viscosity of the fluid.

* * * * *